US012613147B2

(12) United States Patent
O'Donnell et al.

(10) Patent No.: US 12,613,147 B2
(45) Date of Patent: Apr. 28, 2026

(54) TEMPERATURE SENSING WITH PARTICLES IN MEDIUM MATERIAL

(71) Applicant: Analog Devices International Unlimited Company, Limerick (IE)

(72) Inventors: Alan J. O'Donnell, Castletroy (IE); Alfonso Berduque, Crusheen (IE); Javier Calpe Maravilla, Algemesi (ES); Shaun Bradley, Patrickswell (IE); Padraig L. Fitzgerald, Mallow (IE); Jan Kubík, Limerick (IE); Stanislav Jolondcovschi, Carlow (IE); Jochen Schmitt, Biedenkopf (DE); Gavin Patrick Cosgrave, Enniscorthy (IE); Eoin Edward English, Pallasgreen (IE); Michael P. Lynch, Bruff (IE)

(73) Assignee: Analog Devices International Unlimited Company, Limerick (IE)

( * ) Notice: Subject to any disclaimer, the term of this patent is extended or adjusted under 35 U.S.C. 154(b) by 717 days.

(21) Appl. No.: 18/053,523

(22) Filed: Nov. 8, 2022

(65) Prior Publication Data

US 2023/0152166 A1 May 18, 2023

Related U.S. Application Data

(60) Provisional application No. 63/263,978, filed on Nov. 12, 2021.

(51) Int. Cl.
*G01K 11/06* (2006.01)
*G01K 1/024* (2021.01)

(52) U.S. Cl.
CPC .............. *G01K 11/06* (2013.01); *G01K 1/024* (2013.01)

(58) Field of Classification Search
CPC ......... G01K 11/06; G01K 1/024; G01K 3/005
USPC .......................................... 374/160
See application file for complete search history.

(56) References Cited

U.S. PATENT DOCUMENTS

| | | | |
|---|---|---|---|
| 3,675,501 A | * | 7/1972 | De Kanter ............. G01K 11/06 |
| | | | 374/E11.006 |
| 3,956,938 A | | 5/1976 | Carrico |
| 3,970,112 A | | 7/1976 | Bernard |
| 4,028,944 A | | 6/1977 | Erb |
| 4,686,469 A | | 8/1987 | Lewis |
| 4,906,877 A | | 3/1990 | Ciaio |
| 5,502,378 A | | 3/1996 | Atteberry et al. |

(Continued)

FOREIGN PATENT DOCUMENTS

| | | | | |
|---|---|---|---|---|
| AT | | 11171 A1 * | 9/2012 | ............... G01K 7/36 |
| CN | 102737803 | | 10/2012 | |

(Continued)

OTHER PUBLICATIONS

Memsic.com News-49 (Year: 2020).*

(Continued)

*Primary Examiner* — Kristina M Deherrera
(74) *Attorney, Agent, or Firm* — Knobbe, Martens, Olson & Bear, LLP

(57) ABSTRACT

Aspects of this disclosure relate to detecting temperature based on movement of one or more particles within a container. The container includes a medium material. Mobility of the one or more particles in the medium material changes in response to a change in temperature.

20 Claims, 28 Drawing Sheets

(56) References Cited

U.S. PATENT DOCUMENTS

| | | | |
|---|---|---|---|
| 6,030,118 A * | 2/2000 | Schneider | G01K 11/06 |
| | | | 374/E11.006 |
| 6,159,378 A | 12/2000 | Holman et al. | |
| 6,392,562 B1 | 5/2002 | Boston et al. | |
| 6,623,984 B1 | 9/2003 | Fleischman et al. | |
| 6,764,861 B2 | 7/2004 | Prinz et al. | |
| 6,982,501 B1 | 1/2006 | Kotha et al. | |
| 7,048,890 B2 | 5/2006 | Coehoorn et al. | |
| 7,446,524 B2 | 11/2008 | Tondra | |
| 7,575,934 B2 | 8/2009 | Atwood | |
| 7,609,054 B2 | 10/2009 | Tondra et al. | |
| 7,892,856 B2 | 2/2011 | Grate et al. | |
| 8,011,424 B2 | 9/2011 | Murray | |
| 8,190,372 B2 | 5/2012 | Kahlman et al. | |
| 8,283,912 B2 | 10/2012 | Nieuwenhuis et al. | |
| 8,339,370 B2 | 12/2012 | Yun et al. | |
| 8,400,410 B2 | 3/2013 | Taylor et al. | |
| 8,453,505 B2 | 6/2013 | Erdler et al. | |
| 8,689,981 B2 | 4/2014 | Stone et al. | |
| 8,779,532 B2 | 7/2014 | O'Donnell et al. | |
| 8,815,610 B2 | 8/2014 | Berman et al. | |
| 9,041,150 B2 | 5/2015 | O'Donnell et al. | |
| 9,098,141 B2 | 8/2015 | Ciesla et al. | |
| 9,103,824 B2 | 8/2015 | Ovsyanko | |
| 9,157,891 B2 | 10/2015 | Ovsyanko et al. | |
| 9,304,131 B2 | 4/2016 | Ovsyanko | |
| 9,678,064 B2 | 6/2017 | Djennati et al. | |
| 9,737,244 B2 | 8/2017 | Ziaie et al. | |
| 9,786,969 B2 | 10/2017 | Masias | |
| 9,841,421 B2 | 12/2017 | Dittmer et al. | |
| 9,999,369 B2 | 6/2018 | Ziaie et al. | |
| 10,092,903 B2 | 10/2018 | Prins et al. | |
| 10,145,906 B2 | 12/2018 | O'Donnell et al. | |
| 10,620,151 B2 | 4/2020 | Berduque et al. | |
| 10,627,269 B2 | 4/2020 | Mazumdar et al. | |
| 10,730,743 B2 | 8/2020 | Kierse et al. | |
| 10,733,906 B2 | 8/2020 | Pascall | |
| 10,809,195 B2 | 10/2020 | Krishnamoorthy et al. | |
| 10,967,122 B2 | 4/2021 | Cima | |
| 11,035,498 B2 | 6/2021 | Alfadhel et al. | |
| 11,085,554 B2 | 8/2021 | Mou et al. | |
| 11,119,161 B2 | 9/2021 | Iwasaki et al. | |
| 11,127,716 B2 | 9/2021 | McGeehan et al. | |
| 11,214,061 B2 | 1/2022 | Glusti et al. | |
| 11,228,310 B2 | 1/2022 | Zhao et al. | |
| 11,231,635 B2 | 1/2022 | Moon et al. | |
| 11,307,055 B2 | 4/2022 | Schmitt | |
| 11,363,427 B2 | 6/2022 | Volkerink et al. | |
| 2008/0060710 A1 | 3/2008 | Carlson et al. | |
| 2008/0128391 A1 | 6/2008 | Chen et al. | |
| 2011/0206560 A1 | 8/2011 | Neijzen et al. | |
| 2012/0079981 A1 * | 4/2012 | Huffman | G01K 1/02 |
| | | | 116/207 |
| 2013/0085687 A1 | 4/2013 | Danov et al. | |
| 2016/0064126 A1 | 3/2016 | Timonen et al. | |
| 2017/0328931 A1 | 11/2017 | Zhang et al. | |
| 2018/0038737 A1 * | 2/2018 | Hedlund | G01J 5/0205 |
| 2019/0135614 A1 | 5/2019 | Kierse et al. | |
| 2020/0072783 A1 | 3/2020 | Berney et al. | |
| 2021/0148850 A1 | 5/2021 | Berduque et al. | |
| 2021/0262973 A1 | 8/2021 | Berduque et al. | |
| 2021/0322681 A1 | 10/2021 | Bolognia et al. | |
| 2022/0362778 A1 | 11/2022 | Foster et al. | |
| 2023/0085052 A1 | 3/2023 | Klein et al. | |

FOREIGN PATENT DOCUMENTS

| | | |
|---|---|---|
| CN | 1041133606 | 11/2014 |
| CN | 205404333 | 7/2016 |
| CN | 111600456 | 8/2020 |
| CN | 110671957 | 5/2021 |
| FR | 2671870 | 7/1992 |
| KR | 1020150088682 | 8/2015 |
| WO | WO 03/052367 A1 | 6/2003 |
| WO | WO 2006/122203 | 11/2006 |
| WO | WO 2011/142636 | 3/2012 |
| WO | WO 2021/081103 | 4/2021 |

OTHER PUBLICATIONS

International Search Report issued in International Application No. PCT/EP2022/081491, mailed on Feb. 24, 2023.
Written Opinion issued in International Application No. PCT/EP2022/081491, mailed on Feb. 24, 2023.
Al-Hetlani et al., "Continuous magnetic droplets and microfluidics: generation, manipulation, synthesis, and detection", Microchim Acta, 186, 55, 2019.
Boehler et al., "Sensors in the Autoclave-Modelling and Implementation of the IoT Steam Sterilization Procedure Counter", Sensors, 2021, 21(510) 1-17.
Bruls et al., "Rapid integrated biosensor for multiplexed immunoassays based on actuated magnetic nanoparticles", Lab Chip, 2009, pp. 3504-3510.
Cao et al., "Recent advances in manipulation of micro- and nano-objects with magnetic fields at small scales", Materials Horizons, 2020, 7, pp. 638-666.
Campos et al., "Technologies applied in the monitoring and control of the temperature in the Cold Chain", IEEE, 2018, in 6 pages.
Chae et al., "Bimodal neural probe for highly co-localized chemical and electrical monitoring of neural activities in vivo", Biosensors and Bioelectronics, 2021, vol. 191, pp. 1-11.
Chihiro et al., "Development of Molecular Interaction Assay Using Magneto-Resistance Sensor", The 42nd Annual Meeting of the Molecular Biology Society of Japan, Dec. 2019.
D'Uva et al., "Batteryless Wireless Temperature/Humidity Sensor for Item-level Smart Pharma Packaging", IEEE, 2021, pp. 145-149.
Gaster et al., "Matrix-insensitive protein assays push the limits of biosensors in medicine", Nature Medicine, Nov. 2009, 15(11): 1327-1333.
Ji et al., "An Online Cold-Chain Monitoring System Powered by Miniature Smart Tag and Blockchain", IEEE 5th International Conference on Universal Village, 2020, in 5 pages.
Juncker et al., "Cross-reactivity in antibody microarrays and multiplexed sandwich assays: shedding light on the dark side of multiplexing", Current Opinion in Chemical Biology, 2014, vol. 18, pp. 29-37.
Osterfeld et al., "MagArray Biochips for Protein and DNA Detection with Magnetic Nanotags: Design, Experiment, and Signal-to-Noise Ratio", Chapter 15 of Microarrays, 2008, pp. 299-314.
Shafiq et al., "A Battery-Free Temperature Sensor with Liquid Crystal Elastomer Switching Between RFID Chips", IEEE Access, May 21, 2020, vol. 8, pp. 87870-87883.
Wang et al., "Advances in Giant Magnetoresistance Biosensors with Magnetic Nanoparticle Tags: Review and Outlook", IEEE, Jul. 2008, 44(7): 1687-1702.
Wanganoo et al., "Real-Time Data Monitoring in Cold Supply Through NB-IoT", IEEE, Jul. 1-3, 2020, in 6 pages.
Xu et al., "Giant magnetoresistive biochip for DNA detection and HPV genotyping", Biosensors and Bioelectronics, Sep. 15, 2008, vol. 24, pp. 99-103.
Xu et al., "Giant Magnetoresistive Sensors for DNA Microarray", IEEE, Nov. 2008, 44(11): 3989-3991.
Yu et al., "Giant magnetoresistive biosensors for molecular diagnosis: surface chemistry and assay development", Proceedings of SPIE 7035, Biosensing, Aug. 29, 2008.
Yu et al., "Magnetic sensors as a novel multiplex immunoassay platform with high sensitivity", MagArray.
Yu et al., "Sensitive detection of cTnl in whole blood on MagArray biosensors", MagArray.
Yu et al., "Multiplex Autoantibody Detection Using MagArray GMR Biosensors", MagArray.
Zhang et al., "A perspective on magnetic microfluidics: Towards an intelligent future", Biomicrofluidics, 2022, vol. 16, in 9 pages.
Zheng et al., "A Disposable Array Chip using Temperature-Responsive Color Change to Record Temperature History in Terminal Cold Chain Transportation", IEEE, Jun. 23-27, 2019, pp. 1941-1944.

(56) References Cited

OTHER PUBLICATIONS

Zhou et al., "Self-powered Continuous Time-Temperature Monitoring for Cold-Chain Management", IEEE, 2017, pp. 879-882.

Adeyiga et al., "Magnetic microparticle concentration and collection using a mechatronic magnetic ratcheting system", PLOS One, Feb. 18, 2021, pp. 1-15.

Berkelman et al., "Electromagnetic Haptic Feedback System for Use With a Graphical Display Using Flat Coils and Sensor Array", IEEE Robotics and Automation Letters, Apr. 2020, vol. 5, No. 2, pp. 1618-1625.

Datta, P., "Magnetic Gels", Polymeric Gels, 2018, pp. 441-465.

Germano et al., "A Portable and Autonomous Magnetic Detection Platform for Biosensing", Sensors, May 27, 2009, 9:4119-4137.

Gomez-Pastora et al., "Optimization of Magnetic Blood Cleansing Microdevices", Microfluidics Archives—FLOW-3D, pp. 1-24. (accessed Oct. 1, 2021).

Hellebrekers et al., "Soft Magnetic Skin for Continuous Deformation Sensing", Advanced Intelligent Systems, Jul. 25, 2019, 1900025, pp. 1-6.

Kabe et al., "Application of high-performance magnetic nanobeads to biological sensing devices", Analytical and Bioanalytical Chemistry, Jan. 9, 2019, 411:1825-1837.

Le et al., "Inkjet-Printed Graphene for Flexible Micro-Supercapacitors", IEEE, Aug. 15-18, 2011, pp. 67-71.

Lee et al., "Experimental Investigation of Magnetic Particle Movement in Two-Phase Vertical Flow under an External Magnetic Field Using 2D LIF-PIV", Applied Sciences, Jun. 8, 2020, 10, 3976, pp. 1-17.

Lee et al., "Thermomagnetic Convection of Ferrofluid in an Enclosure Channel with an Internal Magnetic Field", Micromachines, Aug. 21, 2019, 10, 553, pp. 1-8.

"Magnetic Separation of Sepsis Pathogen Out of Infected Blood" Medgadget Editors, Mar. 25, 2009.

Maity et al., "Manipulation of Magnetic Properties by Tunable Magnetic Dipoles in a Ferromagnetic Thin Film", IEEE Magnetic Letters, Mar. 21, 2017, vol. 8, in 4 pages.

Mohapatra et al., "Electric Stimulus-Responsive Chitosan/MNP Composite Microbeads for Drug Delivery System", IEEE Transactions on Biomedical Engineering, Jan. 2020, vol. 67, No. 1, pp. 226-233.

Mohammadi et al., "Fingertip Force Estimation via Inertial and Magnetic Sensors in Deformable Object Manipulation" IEEE, Apr. 8-11, 2016, pp. 284-289.

Ngyuen, N.T., "Micro-magnetofluidics: Interactions between magnetism and fluid flow on the microscale", Microfluidics and Nanofluidics, Nov. 16, 2011, in 17 pages.

"Polystyrene Magnetic Particles", MagSphere Inc. (—accessed Oct. 1, 2021).

Rife et al., "Design and performance of GMR sensors for the detection of magnetic microbeads in biosensors", For Sensors and Actuators A, Mar. 19, 2003, in 34 pages.

Shanko et al., Microfluidic Magnetic Mixing at Low Reynolds Numbers and in Stagnant Fluids, Micromachines, Oct. 29, 2019, 10, 731, pp. 1-23.

Sigma-Aldrich, List of Polystyrene Bead Products, available at: https://www.sigmaaldrich.com/US/en/search/polystyrene?focus=products&page=1&perpage=30&sort=relevance&term=polystyrene&type=product (accessed Oct. 1, 2021).

Tian, B., "Magnetic Nanoparticle Based Biosensors for Pathogen Detection and Cancer Diagnostics", Digital Comprehensive Summaries of Uppsala Dissertations from the Faculty of Science and Technology 1647, May 4, 2018, in 56 pages.

"Use of Paraffin Wax with Different Melting Points", King Honor International, Jun. 17, 2019.

Wang et al., "A Mechanically Tunable Artificial Magnetic Conductor using 3-D Printing Technology", IEEE, Sep. 25-27, 2018, in 4 pages.

Yunas et al., "Polymer-Based MEMS Electromagnetic Actuator for Biomedical Application: A Review", Polymers, May 22, 2020, 12, 1184, pp. 1-21.

Yasui et al., "Magnetic Micro Actuator with Neutral Buoyancy and 3D Fabrication of Cell Size Magnetized Structure" IEEE, May 14-18, 2012, pp. 745-750.

* cited by examiner

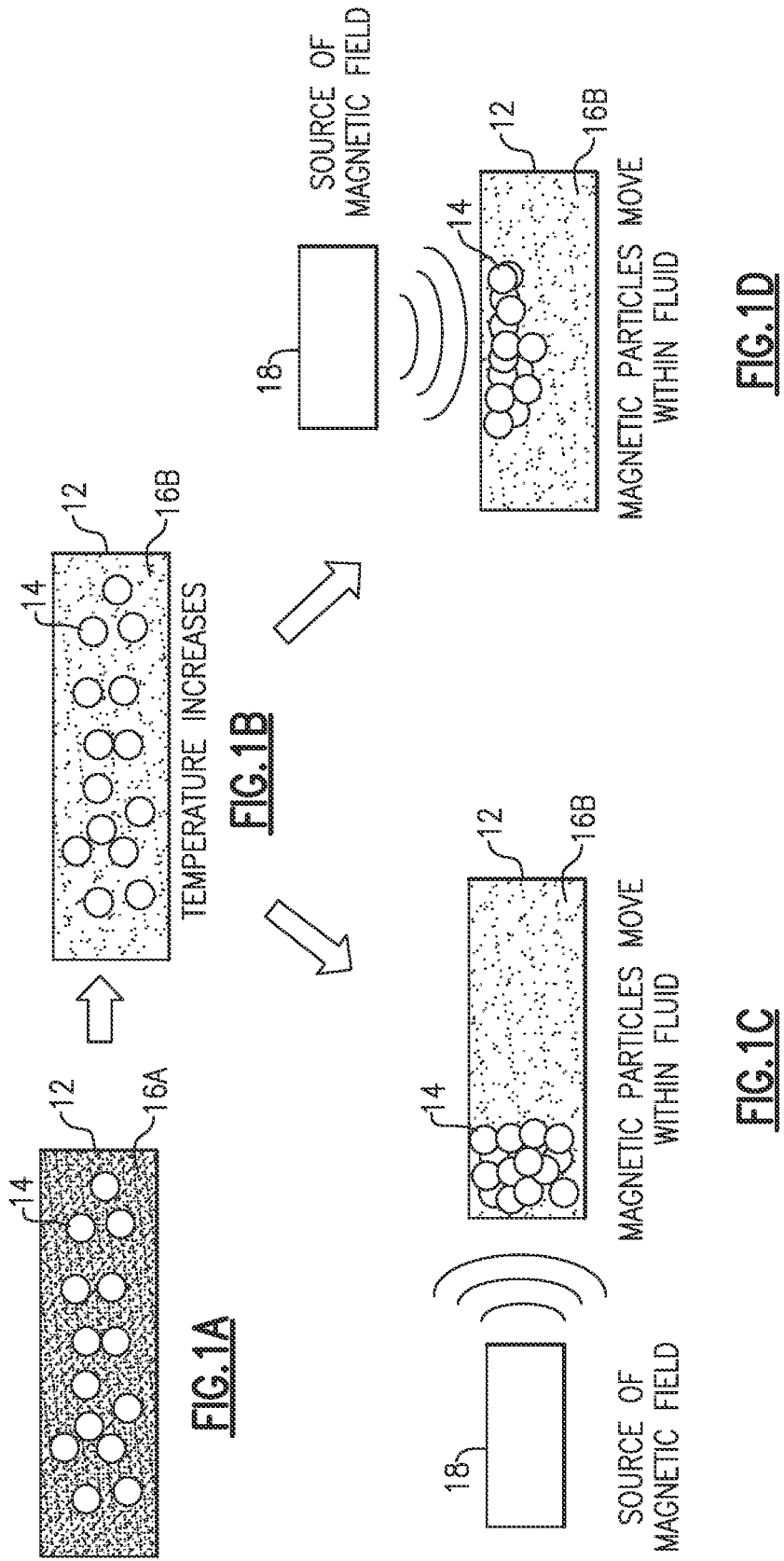

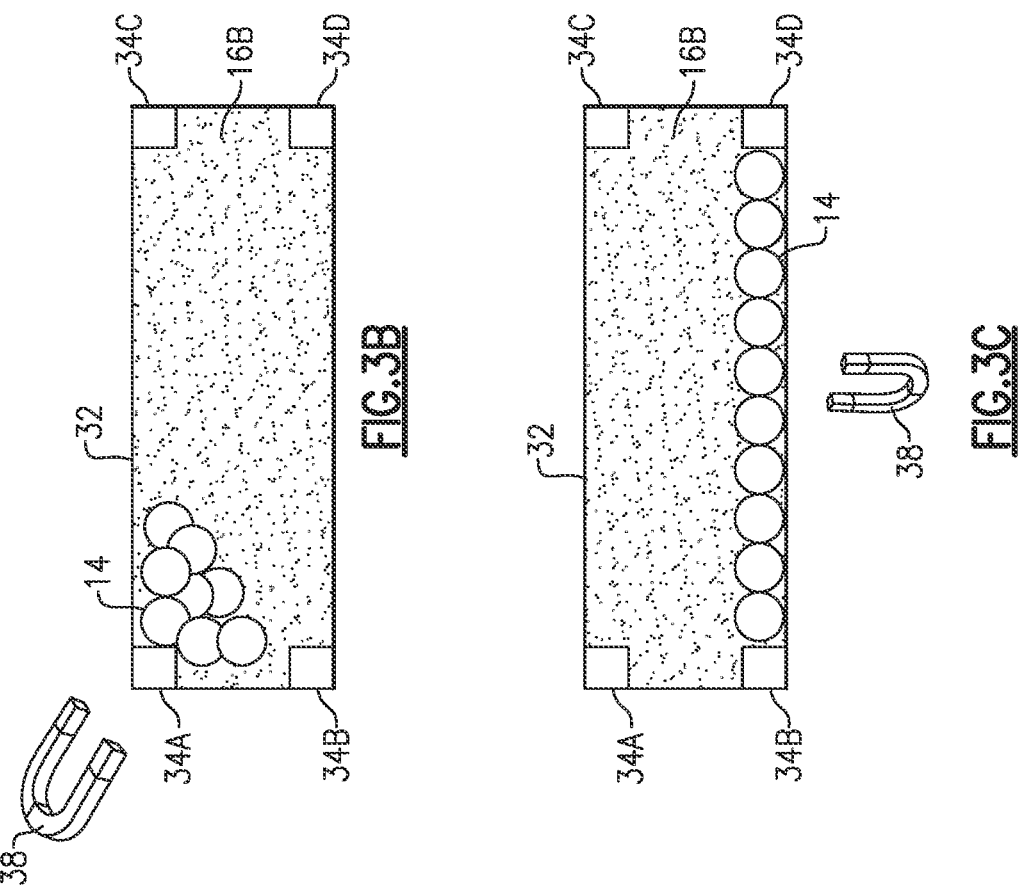
FIG.3B
FIG.3C
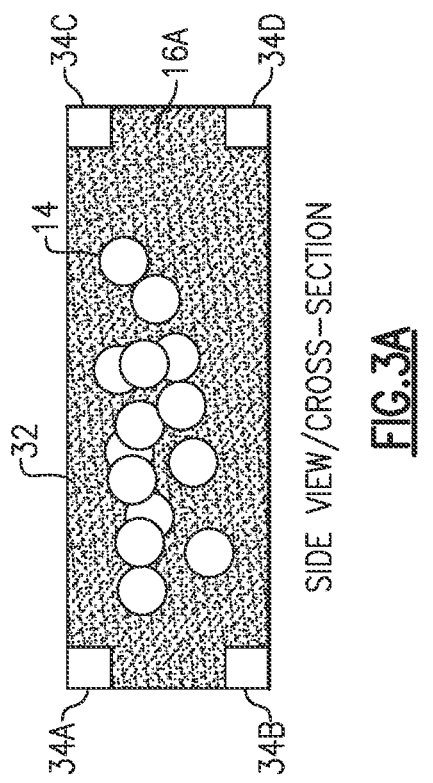
SIDE VIEW/CROSS-SECTION
FIG.3A

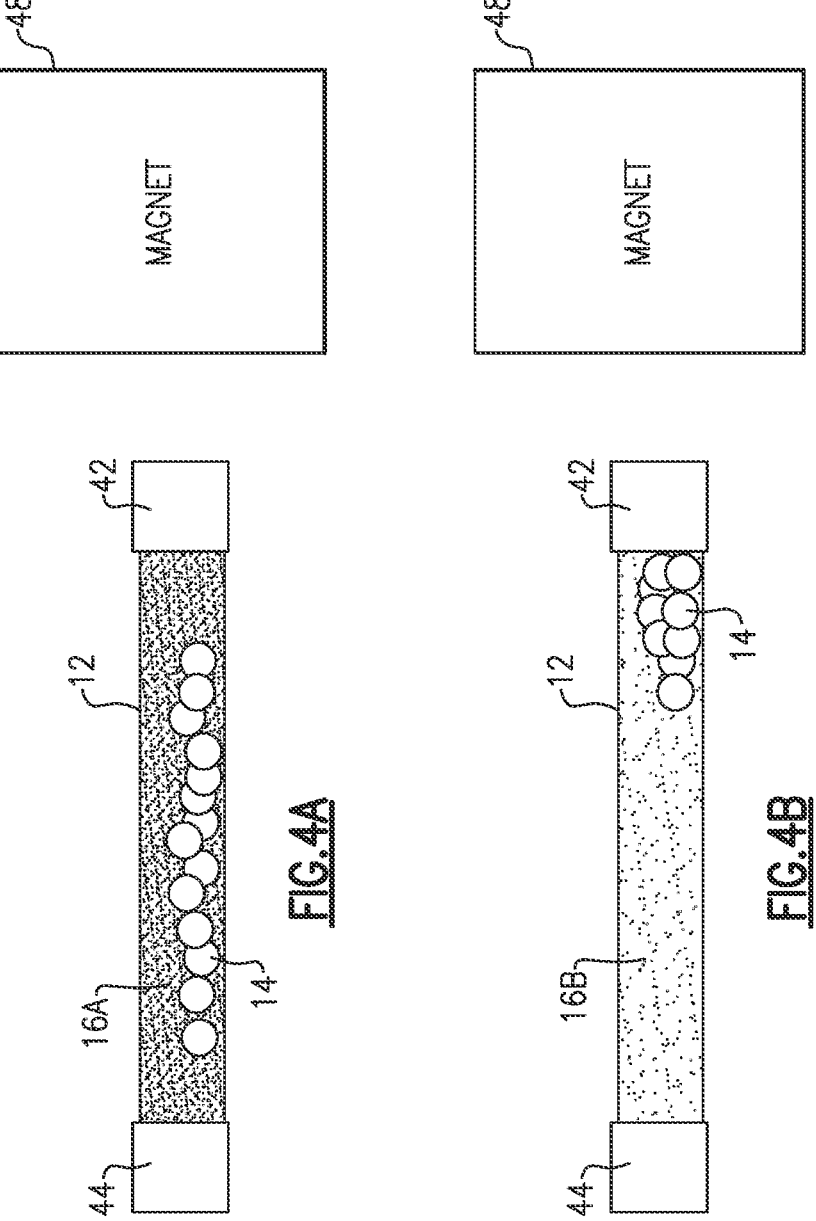

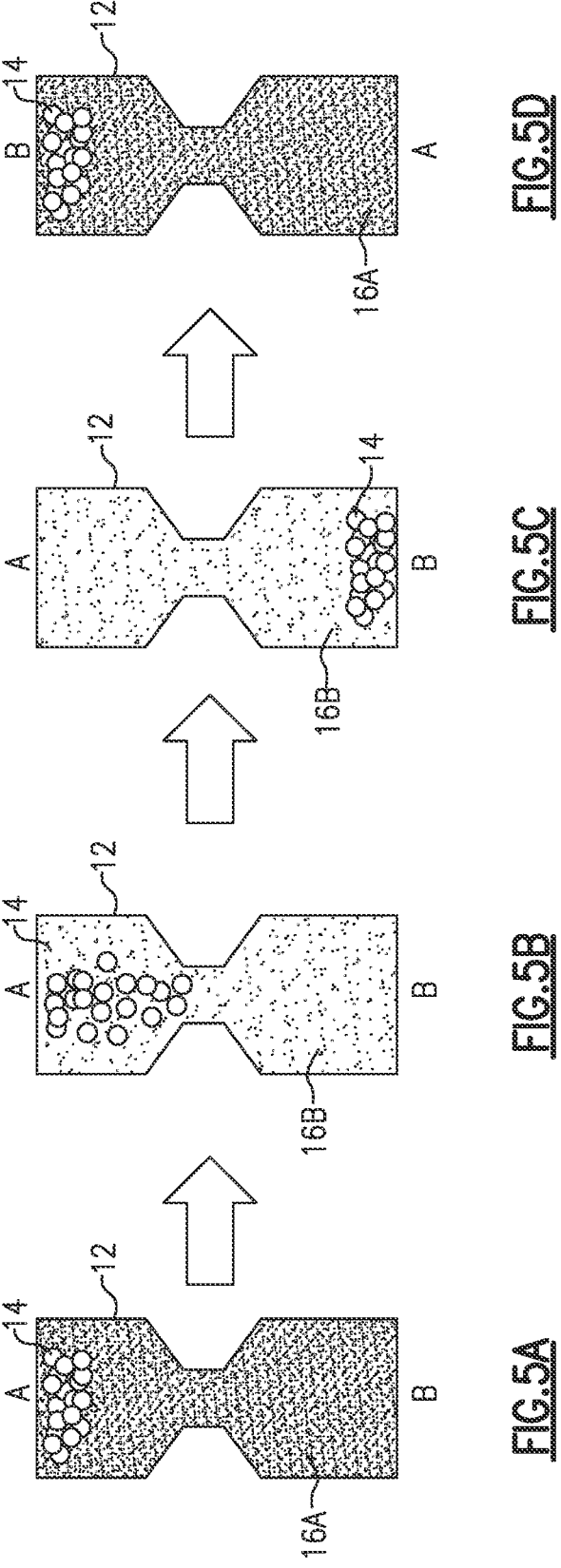

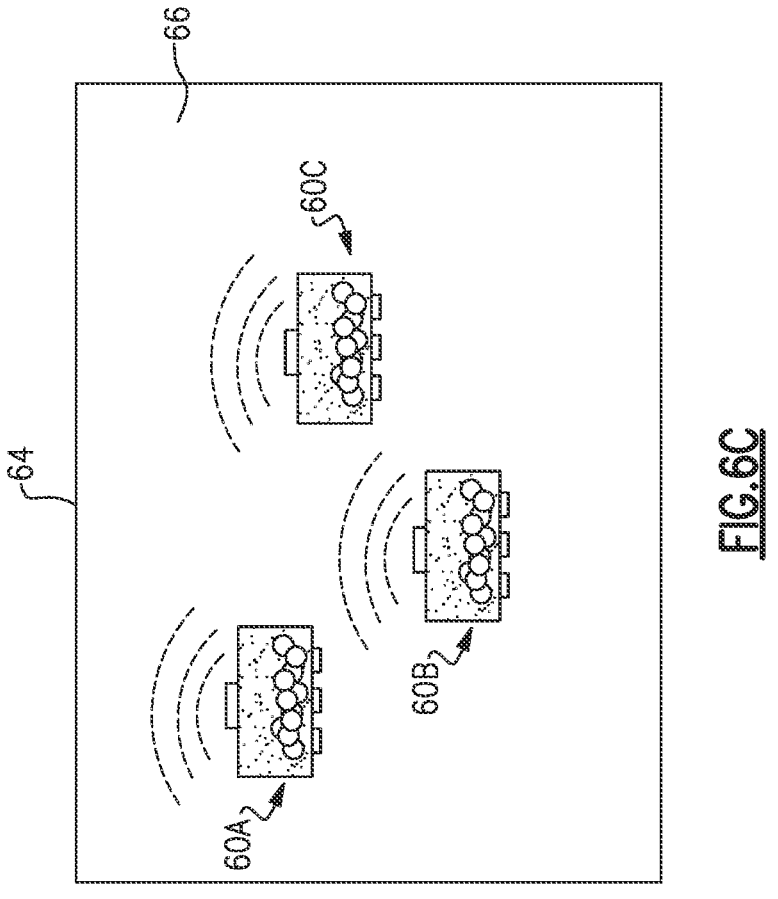
FIG.6C
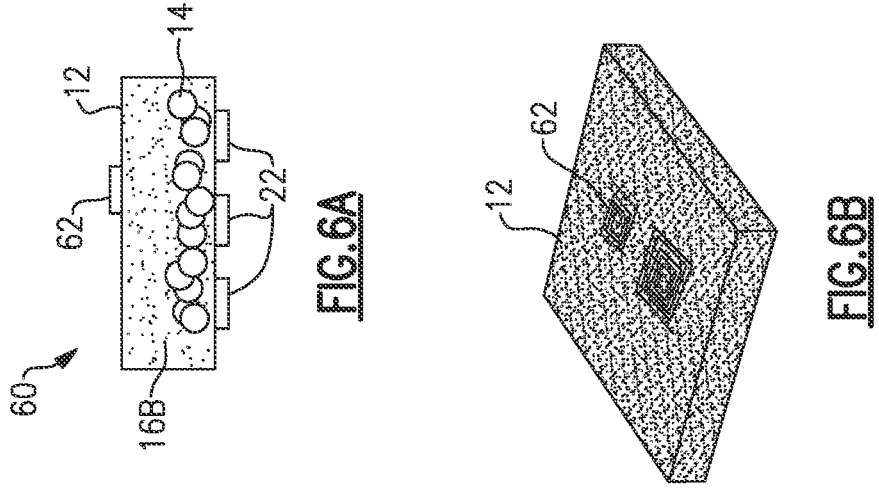
FIG.6A
FIG.6B

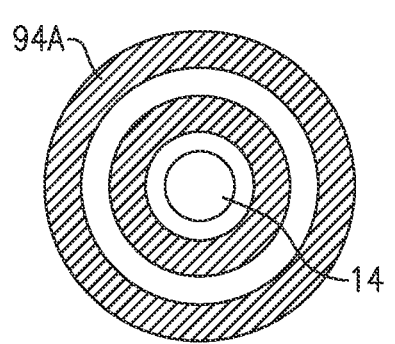
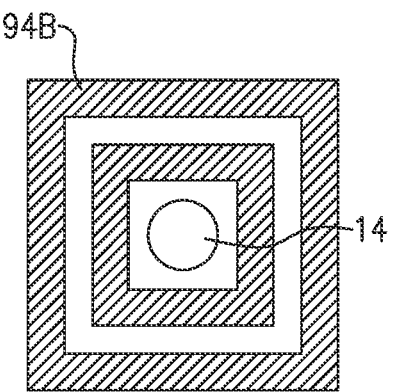
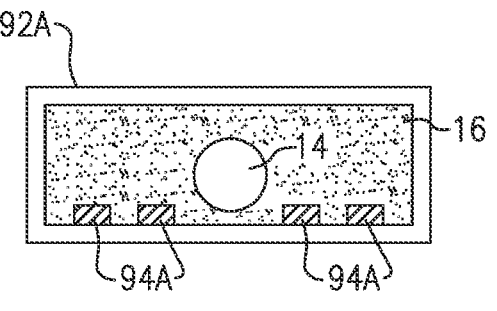
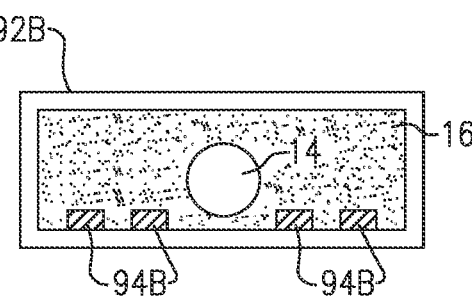
FIG.9A  FIG.9B

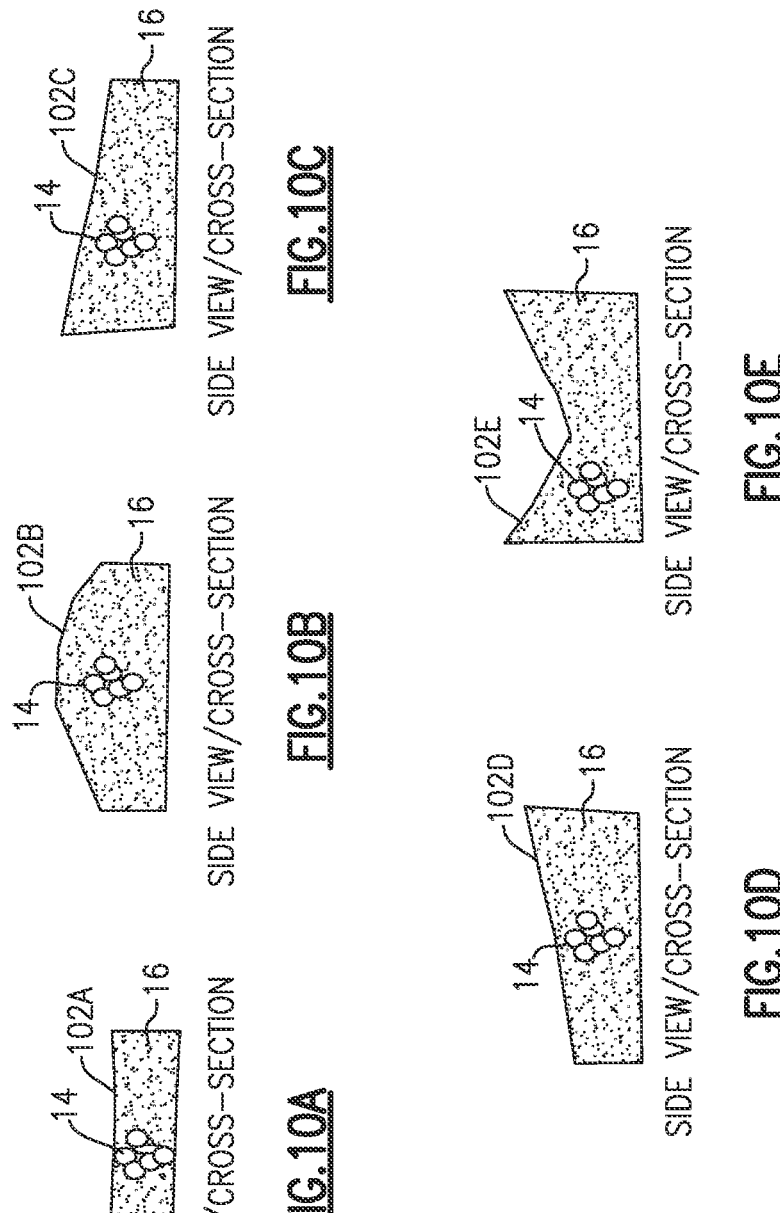

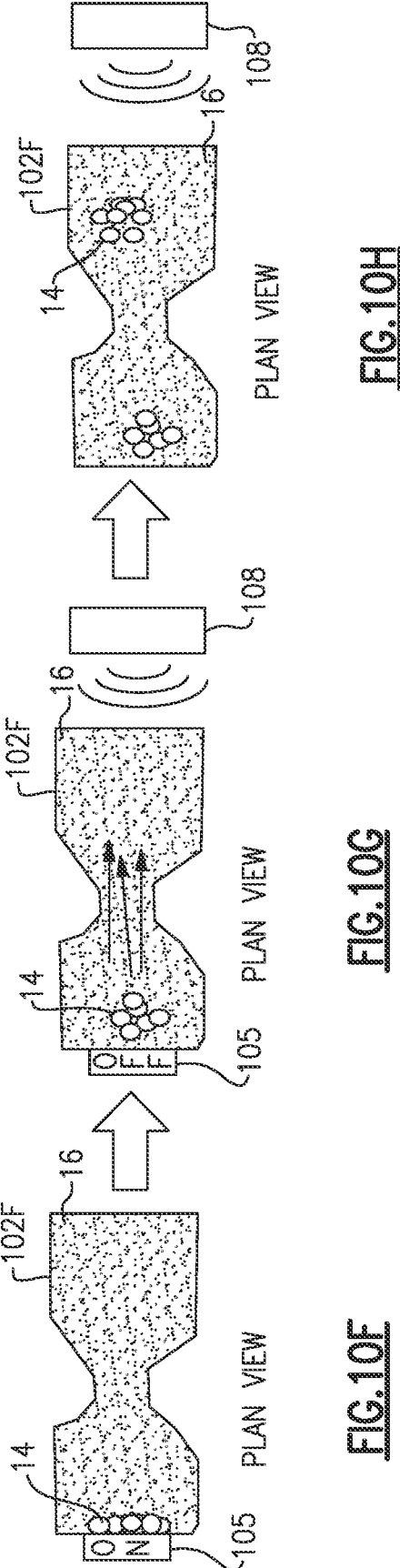
FIG.10F PLAN VIEW
FIG.10G PLAN VIEW
FIG.10H PLAN VIEW

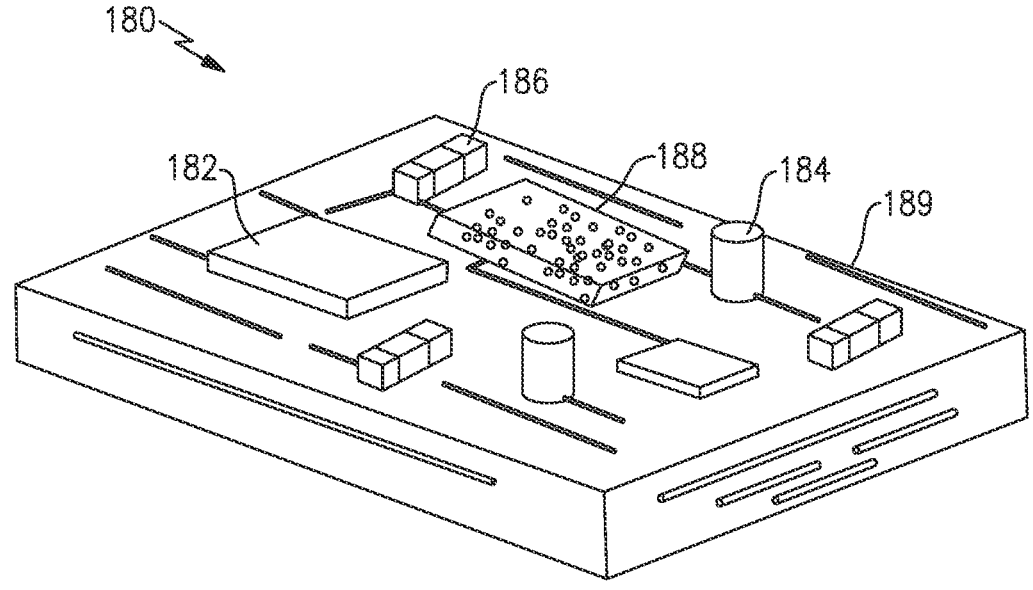
<u>FIG.18</u>

TEMPERATURE SENSING WITH PARTICLES IN MEDIUM MATERIAL

CROSS REFERENCE TO PRIORITY APPLICATION

Any and all applications for which a foreign or domestic priority claim is identified in the Application Data Sheet as filed with the present application are hereby incorporated by reference under 37 C.F.R. § 1.57. This application claims the benefit of priority of U.S. Provisional Application No. 63/263,978, filed Nov. 12, 2021 and titled "TEMPERA-TURE SENSING WITH PARTICLES IN MEDIUM MATERIAL," the disclosure of which is hereby incorpo-rated by reference in its entirety and for all purposes.

BACKGROUND

Technical Field

The disclosed technology relates to temperature detection based on movement of one or more particles in medium material.

Description of Related Technology

Temperature detection is useful in a variety of applica-tions and for a variety of purposes. Certain temperatures sensors, such as diode temperature sensors and silicon bandgap temperature sensors, are manufactured with semi-conductor fabrication processes. Such temperature sensors can be packaged with other semiconductor circuitry.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One aspect of this disclosure is a method of temperature detection. The method includes providing an enclosure that contains particles in a medium material. The particles are magnetically sensitive and/or electrically conductive. The method also includes detecting an indication of temperature based on movement of the particles in the enclosure.

Providing the enclosure can include providing the enclo-sure with the medium material in a first state. The indication of temperature can be detected after the medium material has transitioned from the first state to a second state, where the particles have a higher mobility in the second state than in the first state. The first and second states can be different phases. The medium material can be a solid in a first state and a fluid in the second state. The medium material can change from the first state to the second state in response to the change in temperature. In some instances, the first and second states can both be fluid states with different viscosi-ties at different temperatures. The enclosure can be provided with the medium material as a gel or liquid, and the medium material may not change phase with the change in tempera-ture. Detecting the indication of temperature can include periodic or continuous evaluation of speed of the movement of the particles. The method can include periodically reset-ting and applying a stimulus to cause the particles to move. The medium material can be a solid at room temperature.

Detecting the indication of temperature can be based on measurements of the particles in the medium material before and after a change in temperature.

The movement of the particles can be in response to a magnetic field. The movement of the particles can cause the particles to cluster.

The method can include wirelessly transmitting, from at least one antenna, information associated with the tempera-ture based on the detecting. The method can include encrypt-ing the information associated with the temperature prior to the wirelessly transmitting.

Detecting the indication of temperature can be based on an output of a sensor integrated with the enclosure. The sensor can be a magnetic sensor.

The method can include applying a bias with a magnetic structure integrated with the enclosure.

A measurement circuit can perform the detecting. An integrated circuit can include circuitry of the measurement circuit. The integrated circuit can be integrated with the enclosure.

The method can include providing at least one additional enclosure containing particles in a second medium material, where the second medium material changes phase at a different temperature than the medium material; detecting a lack of movement of the particles in the additional enclo-sure; and determining a temperature range based on the movement of the particles in the enclosure and the lack of movement of the particles in the additional enclosure.

The method can include providing at least one additional enclosure containing particles in medium material, where the enclosure and the additional enclosure are in an envi-ronment; detecting a second indication of temperature based on movement of the particles in the additional enclosure; and outputting temperature information for different loca-tions of the environment based on the indication of tem-perature and the second indication of temperature.

The method can include detecting a second indication of temperature based on a lack of movement of the particles within the enclosure.

The method can include generating a signal indicative of a magnetic field based on positions of the particles within the enclosure after the medium material changes state in response to the change in temperature.

Another aspect of this disclosure is a system with tem-perature detection. The system includes a container, medium material within the container, at least one particle within the container, and a measurement circuit configured to detect an indication of temperature based on movement of the at least one particle within the container. A property of the medium material changes in response to a change in temperature. Mobility of the at least one particle in the container changes in association with a change in the property of the medium material. The at least one particle is magnetically sensitive and/or electrically conductive.

The property can be a phase of the medium material, and the medium material can change from a first phase to a second phase in response to the change in temperature. The medium material can a solid in the first phase, and the medium material can be a fluid in the second phase. The medium material can be a solid at room temperature, and the medium material can be a fluid at a phase change tempera-ture that is above room temperature. The measurement circuit can detect movement of the at least one particle based on a first measurement associated with the medium material being in the first phase and a second measurement associated with the medium material being in a second phase.

The at least one particle can move within the container in response to a magnetic field while the medium material is in the second phase. The at least one particle can remain in a fixed position after the material changes from the first phase to the second phase.

The property that changes through different temperature ranges can be viscosity of the medium material. The measurement circuit can access calibration information associated with particle movement and temperature. The measurement circuit can detect the indication of temperature based on the calibration information and the movement of the at least one particle within the container.

The system can incorporate an antenna in communication with the measurement circuit. The antenna can wirelessly transmit information associated with the temperature. The system can include encryption circuitry configured to encrypt the information associated with the temperature for wireless transmission.

The system can include a second container, second medium material within the second container, and at least one second particle within the second container. The measurement circuit can generate the indication of temperature based on the movement of the at least one particle in the container and lack of movement of the at least one second particle in the second container.

The system can include a magnetic structure integrated with the container. The magnetic structure can provide a bias. The magnetic structure can be a sensor.

The system can include a heating element integrated with the container.

The system can include a piezoelectric element integrated with the container.

The system can include a sensor configured to provide an output to the measurement circuit.

The measurement circuit can include circuitry of an integrated circuit that is integrated with the container.

The measurement circuit can output an indication of a magnetic field based on position of the at least one particle.

The container can be a sealed enclosure.

The at least one particle can include a plurality of particles.

Another aspect of this disclosure is a system with temperature detection. The system includes a plurality of containers. Each of the containers include particles and a different respective medium material. The different respective medium materials change state at different temperatures. The system also includes a measurement circuit configured to output an indication of temperature based on movement of the particles in at least one of the containers.

Another aspect of this disclosure is a method of temperature detection. The method includes providing an enclosure that contains particles in a medium material in a first phase; and maintaining positions of the particles after temperature crosses a threshold at which the medium material changes phase from the first phase to a second phase. The particles have a higher mobility in the second phase than in the first phase. The particles move based on the temperature crossing the threshold.

The particles can be electrically conductive and/or magnetically sensitive.

The method can include determining that the temperature has crossed the threshold after the position or location or concentration of particles produce a discernible signature that can be detected.

The temperature can cross the threshold during a sterilization process. The temperature can cross the threshold in a cold chain application, and the positions of the particles can indicate that the desired temperature range desired during cold chain transportation has been broken.

Another aspect of this disclosure is a method of temperature detection. The method includes providing an enclosure that contains particles in a medium material; after mobility of the particles in the medium material changes in response in response to a change in temperature, optically detecting movement of the particles in the enclosure; and generating an indication of temperature based on the optically detecting.

Another aspect of this disclosure is a method of temperature detection. The method includes providing an enclosure that contains particles in a medium material; and after mobility of the particles in the medium material changes in response in response to a change in temperature, detecting an indication of temperature based on movement of the particles in the enclosure.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will be described, by way of non-limiting examples, with reference to the accompanying drawings.

FIGS. 1A, 1B, 1C, and 1D are schematic side or cross-sectional views of a container that includes particles in a phase change material according to an embodiment.

FIGS. 3A, 3B, and 3C are schematic side or cross-sectional views of an example system for detecting a temperature based on case conductance according to an embodiment.

FIGS. 4A and 4B are schematic side or cross-sectional views a system that senses temperature based on movement of particles within a container according to an embodiment.

FIGS. 5A, 5B, 5C, and 5D are schematic side or cross-sectional views of a system in which particles within a medium material move in response to an increase in temperature according to an embodiment.

FIG. 6A is a schematic side or cross-sectional view of a temperature sensing system with an antenna integrated with a container according to an embodiment. FIG. 6B is a schematic isometric view illustrating an antenna on a surface of the container of FIG. 6A. FIG. 6C is a schematic side or cross-sectional view of an environment that includes a plurality of temperature sensing systems of FIG. 6A.

FIGS. 9A and 9B are schematic cross-sectional and corresponding plan views of example enclosures with patterned structures according to embodiments.

FIGS. 10A, 10B, 10C, 10D, and 10E are schematic side or cross-sectional views of example containers with various cross-sectional shapes according to embodiments.

FIGS. 10F, 10G, and 10H illustrate schematic plan views of a container with a constricted region according to an embodiment.

FIG. 18 is a schematic isometric view of an electronic module with electronic elements temperature sensing based on movement of particles in a container according to an embodiment.

DETAILED DESCRIPTION OF CERTAIN EMBODIMENTS

Figure 2A:
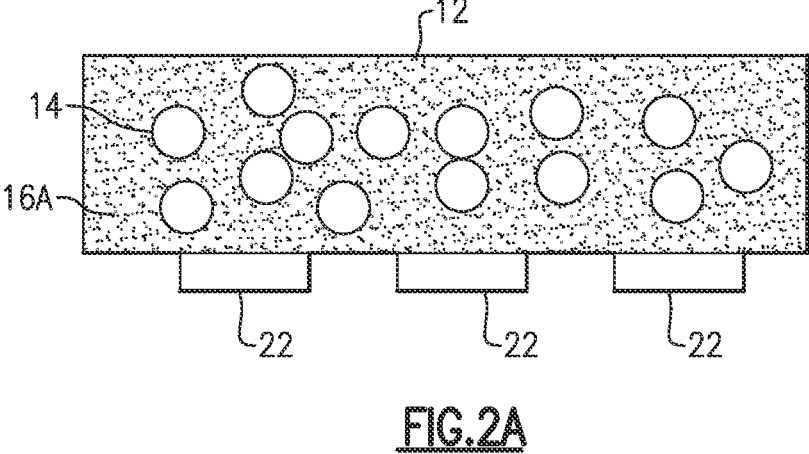
FIGS. 2A and 2B are schematic side or cross-sectional views of a container with particles in a phase change material, where the container has integrated sensors according to an embodiment.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the illustrated elements. Further, some embodiments can incorporate any suitable combination of features from two or more drawings. The headings provided herein are for convenience only and do not necessarily affect the scope or meaning of the claims.

Aspects of this disclosure relate to detecting temperature based on movement of at least one particle within a container. The particles can be embedded in a medium material within a container that retains the particles. The particles can be magnetically sensitive and/or electrically conductive. The medium material can change state in response to a change in temperature. Such a change in state of the medium material affects the mobility of the particles within the container. For example, at a lower temperature, the particles may not move at all within the container. Then when temperature rises above a threshold, the particles can be mobile due to a change in state of the medium material. Temperature can be detected based on movement of the particles within the container in response to a stimulus. Whether or not the particles have moved in response to the stimulus can indicate whether container is above or below a threshold temperature at which the medium material changes state. A measurement circuit can output an indication of temperature based on the movement of the particles within the container. Alternatively or additionally, temperature can be detected based on lack of movement of the particles within the container in response to a stimulus. The change in state with temperature change can be a phase change, such as from solid or gel phase to liquid phase. The change in state with temperature change can be a change in viscosity of the medium material with or without changing the phase of the medium material, and temperature can be detected based on rate of particle movement in response to a known stimulus where such a change in viscosity occurs.

Embodiments disclosed herein can achieve advantages over other methods of temperature detection. For example, there can be advantages related to manufacturing. A container with particles can be manufactured separately from electronics, such as a measurement circuit, in a non-semiconductor process. As another example, parts of systems disclosed herein can be configured for temperature detection in environments that are not typically suitable for semiconductor components. Enclosing particles in a container of certain materials (for example, glass or ceramic) can enable at least part of the system to be exposed to a harsher environment than standard packaged semiconductor circuitry.

Advantageously, systems disclosed herein can detect temperature and also detect a magnetic field based on movement, lack of movement or positions of particles within a container in response to applied stimuli, such as magnetic fields. In certain applications, omnidirectional magnetic field detectors that also detect temperature can be implemented efficiently in accordance with principles and advantages disclosed herein. For instance, temperature can be detected based on movement of particles, for example, in response to a biasing magnetic field. An external magnetic field can then also be detected by detecting positions of the particles in response to the external magnetic field. Moreover, modifying the sensitivity and/or range in such magnetic field detectors can be relatively easy by changing one or more features of the particles (e.g., nature, size, or number of particles), one or more features of the medium material in which the particles are embedded/immersed, or one or more features of the enclosure (e.g., by adding one or more shields or thinning the enclosure).

In some instances, multiple sensors can be located in different locations. For example, multiple sensors can be located within a tank of fluid. Above about 125° C., conventional silicon, batteries, and nonvolatile memory may not be robust. Embodiments of temperature sensing disclosed herein can operate at temperatures above this where movement or clusters of particles within an enclosure can indicate the temperature of at least a portion of fluid. Also the fluid/medium material within the enclosure can change state (e.g., liquid to gas/vapor, or decrease in liquid viscosity) such that the movement of particles (e.g., from slow to rapid/excited movement) may indicate temperatures within a range or some other aspect of what is being monitored. Systems disclosed herein can be used to monitor temperature in applications, such as pharmaceutical applications, where the pharmaceutical material and/or the medium material transitions/matures through different phases. Such temperature sensing can be useful in applications where the value of the material in the tank can appreciate significantly.

Systems disclosed herein can be used to monitor temperature exposure in a chain of goods, such as a cold chain, or other cold storage applications. For example, systems disclosed herein can be used to ensure that goods are maintained at a sufficiently low temperature to preserve products and/or prevent spoilage. In certain applications, particles can be distributed in a medium material that is solid at lower temperatures. A side of the enclosure can be metallic. If ambient temperature exceeds a certain value for sufficient time, the state of the medium can change and allow particle mobility, such that the particles will be free to move towards one side under a stimulus where they can be detected. For example, the particles can be metallic and the enclosure can be magnetized, or vice versa. Alternatively, the stimulus can be gravity and the particles can fall to the bottom side. Once said movement has been detected, it can be determined that the goods of interest (e.g., food or pharmaceuticals) have exceeded the allowable temperature exposure and can be assumed spoiled. In such applications, temperature detection can be hard to manipulate. Accordingly, a reliable indication of whether a cold chain or cold storage environment has been maintained can be provided.

Particles in Medium Material

Particles can be embedded in medium material within a container, where mobility of the particles in the medium material changes with temperature. A property of the medium material can change in response to changes in temperature, and this property can affect mobility of the particles in the medium material. The property can be a phase of the medium material or a viscosity of the medium material. The medium material can be a phase change material that can change phase (e.g., solid, gel, liquid, vapor) in response to a change in temperature. In certain instances, the change in mobility of the particles can be associated with a phase change of the medium material that results from a change in temperature. In some instances, the change in mobility of the particles can be associated with a change in viscosity of the medium material that results from a change in temperature. The change in viscosity of the medium material can occur without a complete phase change of the medium material. The change in viscosity can occur in a medium material that is a gel or a liquid.

The change in state of the medium material affects mobility of particles within the container. The change in mobility of particles in the medium material can also affect sensitivity of another measurement by a system. For example, the medium material changing state can increase the mobility of particles such that the particles move more in response to the same stimulus (e.g., external magnetic field) to thereby increase sensitivity of magnetic field detection. The mobility of magnetically sensitive particles can depend on the viscosity of the medium material and the intensity of an external magnetic field.

The system can implement a sensor element that activates when a temperature crosses a threshold (e.g., goes above a threshold temperature). Detecting movement of the particles can indicate that a minimum temperature has been reached. As the medium material goes through phases (e.g., melts, simmers, boils, etc.), the particles can become more agitated. This can be detected and indicate that a specific temperature range has been reached. For example, if a container is positioned within a liquid or a solution, the system can be used to track temperature exposure. Monitoring the particles can provide an inference of the stage of the liquid or solution. Such monitoring can be performed continuously or intermittently.

In certain applications, a system can implement a sensor element that detects temperature based on particle movement associated with a change in viscosity of the medium material. Such temperature detection can involve periodic or continuous evaluation of speed of particle movement. A stimulus to move the particles can be continuously applied (e.g., as an alternating current voltage or alternating applied magnetic field). Alternatively or additionally, the positions of the particles can be periodically reset and a stimulus can be applied to move the particles. A measurement circuit can access calibration information (e.g., as a look up table or formulaic relationship) between particle movement (e.g., speed) and temperature. The skilled artisan can readily obtain such calibration information for a given device configuration (medium composition, particle composition and shape, etc.) through routine experimentation.

In some instances, the system can wirelessly transmit temperature information from one or more antennas. For example, radio frequency identification (RFID) tags can be arranged to transmit temperature and/or other sensed information.

In certain applications, a container can include an optical window and clusters or movement of particles can be detected optically. For example, once a temperature is reached within a phase change medium material, particles can move and cluster be detected optically (e.g., through an optically transparent window of a container). Even if the temperature has dropped below the threshold temperature of interest and the mobility of the particles again reduced, the fact that the particles have moved under the stimulus (e.g., gravity, magnetic field, electrical field) to the optically (or visually) detected position can be taken as an indication that the threshold temperature has been crossed in the past.

In certain applications, a plurality of containers with different medium materials can be implemented together in a system. Each of the containers can contain a different medium material that changes state at a different temperature. By detecting movement and/or lack of movement of particles within the plurality of containers exposed to the same or a similar applied stimuli (e.g., magnetic field), a temperature range can be determined. Thus, even for devices configured only for binary determination of temperatures above or below a threshold temperature, systems comprising multiple such devices with different mediums and thus different temperature thresholds can provide more information about temperature ranges.

FIGS. 1A, 1B, 1C, and 1D illustrate a container 12 that includes particles 14 in a medium material 16 according to an embodiment. The container 12 can be a sealed enclosure. The particles 14 can include any suitable combination of features of the particles disclosed herein. For example, the particles 14 can be magnetically sensitive. Alternatively or additionally, the particles can be electrically conductive. More details regarding magnetically sensitive particles are provided below. In various drawings, the medium material 16 is labelled as 16A for a lower mobility state or as 16B for a higher mobility state. The skilled artisan will appreciate that the reference number 16 is employed herein to refer to the medium material generically, without regard to its phase or state.

The medium material 16 can be a gel or a fluid that has different physical phases at different temperatures. For example, the medium material 16 can be solid or gel-like at room temperature and fluid, such as liquid, at a higher temperature, such as temperature of at about 10° C. above room temperature. For instance, wax, coconut oil, or fat are example medium materials that are solid at room temperature and liquid at higher temperatures. As an example, the medium material 16 can be paraffin wax, which has a relatively low melting point. Paraffin wax can have a melting point in a range from 37° C. to 60° C. As another example, the medium material 16 can be an agarose gel. Certain agarose gels can have a melting point in a range from around 60° C. to 100° C. Other examples of the medium material 16 include without limitation acrylic gels, glycolic acid, durene, benzamide, lauric acid, docosyl bromide, trimystrin, or any commercially available phase change material suitable for a target temperature range of interest. In some applications, the medium material 16 can be a liquid in a first phase and transition to being a gas or vapor in a second phase, where the medium material 16 has a higher mobility in the second phase than in the first phase. In some other applications, the medium material 16 can be a liquid or gel with viscosity that changes with temperature, hence affecting the mobility of the particles 14.

A particular medium material can be selected to detect exposure above a particular threshold temperature, for example based on the melting point of the particular medium material. Similarly, a particular medium material can be selected to detect exposure below a particular threshold temperature, for example based on the melting point of the particular medium material.

In certain applications, the medium material 16 can have a relatively low melting point. Examples of such applications include without limitation cold chain applications and/or cold storage applications. In such applications, the melting point of the medium material 16 can be less than 25° C. For example, the melting point of the medium material 16 can be in a range from about 0° C. to about 25° C. in certain applications. Examples of medium materials for applications cold chain application and/or cold storage applications include without limitation acetic acid, paraffin 14-carbons, paraffin 15-carbons, paraffin 16-carbons, paraffin 17-carbons, Mn(NO3)2·6H2O/MnCl2·4H2O (4%), glycerine, and water. These example medium materials and their melting points are provided in Table 1.

TABLE 1

| Medium Material | Melting Point |
|---|---|
| Acetic acid | 16.7° C. (62.1° F.) |
| Paraffin 14-Carbons | 5.5° C. (41.9° F.) |
| Paraffin 15-Carbons | 10° C. (50° F.) |
| Paraffin 16-Carbons | 16.7° C. (62.1° F.) |
| Paraffin 17-Carbons | 21.7° C. (71.1° F.) |
| Mn(NO$_3$)$_2$ · 6H$_2$O/MnCl$_2$ · 4H$_2$O(4%) | 15-25° C. (59-77° F.) |
| Glycerin | 17.9° C. (64.2° F.) |
| Water | 0° C. (32° F.) |

The medium material 16 can be any suitable phase change material. Such phase change material can have a melting point down to −50° C. The melting point of a phase change material can be below 0° C. For certain cold chain and/or cold storage applications, the melting temperatures of the example materials of Table 2 can be useful. Table 2 lists phase change materials that are commercially available from Phase Change Solutions of Asheboro, North Carolina and the melting points of these phase change materials. Such phase change materials can transition phases between solid-to-gel and solid-to-liquid. The phase change materials can store and release thermal energy at any suitable precise temperature within the range of −75° C. to 175° C., such as within a range of −75° C. to 25° C. Example applications with such phase change materials include without limitation control of pharmaceuticals and/or food products during transportation. Table 2 includes example phase change materials that can be used for cold chain and/or cold storage applications.

TABLE 2

| Phase Change Material | Melting Point |
|---|---|
| 0100-Q-05 BioPCM | −5° C. (23° F.) |
| 0100-Q-10 BioPCM | −10° C. (14° F.) |
| 0100-Q-15 BioPCM | −15° C. (5° F.) |
| 0100-Q-20 BioPCM | −20° C. (−4° F.) |
| 0100-Q-22 BioPCM | −22° C. (−8° F.) |
| 0100-Q-25 BioPCM | −25° C. (−13° F.) |
| 0100-Q-27 BioPCM | −27° C. (−17° F.) |
| 0100-Q-30 BioPCM | −30° C. (−22° F.) |
| 0100-Q-35 BioPCM | −35° C. (−31° F.) |
| 0100-Q-40 BioPCM | −40° C. (−40° F.) |
| 0100-Q-45 BioPCM | −45° C. (−49° F.) |
| 0100-Q-50 BioPCM | −50° C. (−58° F.) |
| 0200-Q1 BioPCM | 1° C. (34° F.) |

In certain applications, the medium material 16 can have a relatively high melting point. Examples of such applications include without limitation sterilization applications. In such applications, the melting point of the medium material 16 can be greater than 80° C. For example, the melting point of the medium material 16 can be in a range from about 80° C. to about 130° C. in certain applications. Examples of medium materials with relatively high melting points include without limitation alpha naphthol, glautaric acid, p-Xylene dichloride, catechol, quinone, acetanilide, succinic anhydride, benzoic acid, stibene, and benzamide. These example medium materials and their melting points are provided in Table 3.

TABLE 3

| Medium Material | Melting Point |
|---|---|
| Alpha napthol | 96° C. (205° F.) |
| Glautaric acid | 97.5° C. (207.5° F.) |

TABLE 3-continued

| Medium Material | Melting Point |
|---|---|
| p-Xylene dichloride | 100° C. (212° F.) |
| Catechol | 104.3° C. (219.7° F.) |
| Quinone | 115° C. (239° F.) |
| Actanilide | 118.9° C. (246.0° F.) |
| Succinic anhydride | 119° C. (246° F.) |
| Benzoic acid | 121.7° C. (251.1° F.) |
| Stilbene | 124° C. (255° F.) |
| Benzamide | 127.2° C. (261.0° F.) |

At lower temperatures, the particles 14 can have relatively fixed positions without discernible movement of the particles 14 within the container 12 in the presence of a stimulus, such as a magnetic field. At such temperatures, there can be no significant change to electrical output of a measuring circuit in response to a stimulus. FIG. 1A illustrates particles 14 at lower temperatures. The medium material 16A is illustrated in a first state in FIG. 1A. The particles 14 have low mobility in the first state. The particles 14 can be in an initial position in the first state. In an embodiment, a biasing structure can bias the particles to be in the initial position. The particles 14 can be regularly distributed in the medium material 16, which can be manipulated at low temperatures as a gel with high viscosity in the absence of magnetic fields Above a certain temperature, the particles 14 can move within the container 12. The movement of the particles 14 can be in response to a stimulus. Such a stimulus can be a biasing magnetic field. The medium material 16 can transition to a second state above the certain temperature. FIG. 1B illustrates the medium material 16B after a change in state resulting from increased temperature. The particles 14 have an increased mobility in FIG. 1B relative to FIG. 1A.

When the particles 14 are magnetically sensitive, a magnetic field source 18 can apply a magnetic field to move the particles 14 within the medium material 16. In some instances, the magnetic field source 18 can be a magnetic body. The magnetic field source 18 can include alternating poles. This can enhance attraction of particles 14 that are magnetically sensitive. The applied magnetic field can be a gradient magnetic field to move the particles 14 that are magnetically sensitive. A homogenous magnetic field can cause the particles 14 that are magnetically sensitive to attract each other and cluster. In some instances, clustering of the particles 14 can be detected.

Alternating magnetic fields can produce a generally continuous movement of the particles 14, which can be detected. If the particles 14 are conductive, the particles 14 can generate a current that can be measured. The motion of these particles 14 can also create an increase in temperature due to friction so a temperature sensor could measure the intensity of the alternating field associated with this increase in temperature. The increase in temperature due to friction can provide a reset mechanism.

FIG. 1C illustrates that a magnetic field can move the particles 14 to a side of the container 12 when the medium material 16B is in the second state. FIG. 1D illustrates that a different magnetic field can move the particles 14 in a different direction when the medium material 16B is in the second state. Applying the same magnetic fields corresponding to FIGS. 1C and 1D would not result in similar movement of the particles 14 when the medium material 16A is in the first state.

Based on the movement of the particles 14 to the positions shown in FIGS. 1C and 1D in response to the applied stimulus (magnetic field in this case), a measurement circuit can detect that the temperature is above the temperature at which the medium material 16 changes from the first state to the second state. This can provide an indication of temperature based on movement of the particles 14 within the container 12. The lack or dearth of movement of the particles 14 associated with FIG. 1A can be used to determine that a temperature is below the temperature at which the medium material changes from the first phase to the second phase, or if the state change is a change in viscosity. For instance, a stimulus, such as the illustrated magnetic field, can be applied to the particles 14 and the lack of movement in response to the stimulus can indicate a temperature associated with that the medium material 16 being in the first state. Different movement of the particles 14 in response to a similar stimulus can indicate different temperatures associated with different respective mobilities of the particles 14 in the medium material 16. Other stimuli capable of causing ready particle movement when the medium material 16 is in a fluid state include, without limitation, application of one or more of force/acceleration including mechanical shock, vibration or gravity (see FIGS. 5A to 5F), electric fields, etc. to the container.

Based on the positions of the particles 14 shown in FIG. 1C or FIG. 1D, the measurement circuit can generate an indication of an applied magnetic field. This can measure the magnetic field based on positions of the particles 14 within the container 12. The magnetic field can be measured after temperature sensing. The measurement of the medium material 16 changing phase can function to activate magnetic field detection. There can be a biasing magnetic field that causes the particles 14 to move from an initial position in response to the medium material 16 changing phase. Then an external magnetic field can be detected accounting for the known biasing magnetic field. Any of the other temperature sensing systems disclosed herein can detect an applied magnetic field as suitable. Magnetic field sensing can be performed in accordance with any suitable principles and advantages disclosed in U.S. patent application Ser. No. 17/933,600 filed Sep. 20, 2022, the disclosure of which is hereby incorporated by reference in its entirety herein and for all purposes.

In FIGS. 1C and 1D, the particles 14 are magnetically sensitive and attracted to the applied magnetic field. Such particles 14 can be paramagnetic, for example. Paramagnetic materials include metals that are weakly attracted to magnets. Examples of paramagnetic materials include lithium, aluminium, tungsten, platinum, and manganese salts. The particles 14 can be ferromagnetic. Such particles 14 can include one or more suitable ferromagnetic material, such as iron, nickel, or cobalt. In some other applications, the particles 14 can be diamagnetic and be repelled from the applied magnetic field. Examples of diamagnetic materials include graphite, gold, bismuth, antimony, quartz, and silver. In certain applications, particles 14 can include polystyrene (PS) magnetic particles.

Although embodiments disclosed herein may be described with references to particles having different mobility in two different states of a medium material, any suitable principles and advantages can be applied to temperature sensing using particles having different mobility in more than two different states of a medium material. For example, particles can have different mobility when a medium material is a solid, when the medium material is a liquid, and when the material is in a vapor state. A measurement circuit can provide an indication of temperature associated with one of more than two states of the medium material to indicate temperature. Although some embodiments disclosed herein may be described with references to medium material changing phase, any suitable principles and advantages disclosed herein can be applied to temperature sensing based on movement of particles in a medium material in which the state change is a change in viscosity based on temperature. A measurement circuit can provide an indication of temperature associated with one or more viscosities of the medium material (as measured by way of change in particle position or velocity) to indicate temperature.

Position and/or movement of particles can be measured in a variety of different ways. Without limitation, example measurements include magnetic sensing measurements, conductive measurements, case conductance measurements, cumulative exposure detection measurements, microelectromechanical systems based measurement, optical measurements, and capacitive measurements. Example sensing systems and methods are discussed with reference to various figures below and/or in U.S. patent application Ser. No. 17/933,600 filed Sep. 20, 2022. These sensing systems can include particles and containers in accordance with any suitable principles and advantages disclosed herein. Any suitable principles and advantages of the sensing systems disclosed herein can be implemented together with each other.

One or more sensors can sense positions and/or movement of particles within a container. Such sensors can be integrated with the container in certain applications. Example sensors include magnetic sensors, microelectromechanical systems (MEMS) based sensors, capacitive sensors, optical sensors, and the like. Examples of such magnetic sensors include magnetoresistive sensors (for example, anisotropic magnetoresistance sensors, giant magnetoresistance sensors, or tunnel magnetoresistance sensors), fluxgate sensors, Hall effect sensors, search-coil sensors, and the like.

Figure 2B:
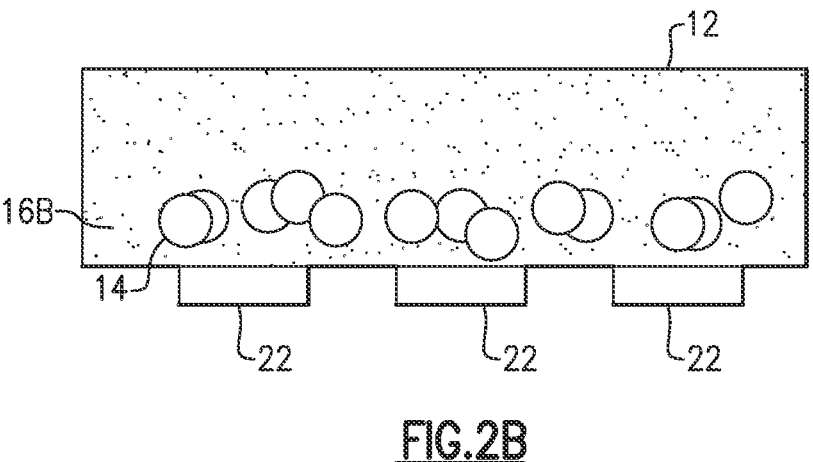

FIGS. 2A and 2B illustrate a container 12 with integrated magnetic sensors 22 according to an embodiment. The magnetic sensors 22 can be an array of magnetic sensors, such as a one dimensional array, a two dimensional array or a three dimensional array positioned on or near the container 12. As illustrated, the magnetic sensors 22 are positioned on an outer surface of the container 12. The container 12 includes a medium material 16 (shown in a first state 16A and a second state 16B) and particles 14. The particles 14 can be magnetically sensitive. The particles 14 can be electrically conductive. The magnetic sensors 22 can sense position and/or movement of the particles 14 within the container 12. Depending on the magnetic sensors 22 used in a particular application, a biasing field can be present for particle detection. The biasing field can be a stimulus for causing the particles 14 to move in response to the medium material 16 changing state.

FIG. 2B illustrates a state where the medium material 16B is at a higher temperature than in FIG. 2A and the particles 14 have a higher mobility in the medium material 16B than in FIG. 2A. A magnetic field can be applied to move the particles 14 to the positions shown in FIG. 2B. The magnetic sensors 22 can detect the positions and/or movement of the particles 14. A measurement circuit connected to the magnetic sensors 22 can output an indication of temperature. The measurement circuit can also output an indication of the applied magnetic field, for example, as described elsewhere herein.

Movement and/or positions of particles can be determined a variety of different ways other than the magnetic sensor measurements of FIGS. 2A and 2B. Another example of determining movement and/or positions of particles is based on a conductive case measurement. A container enclosing fluid can be partially or completely conductive. A plurality of contacts can be provided on the container for taking a measurement associated with particle location.

FIGS. 3A, 3B, and 3C illustrate an example system where positions and/or movement of particles can be measured by a case conductance measurement according to an embodiment. A container 32 enclosing a medium material 16 (shown in a first state 16A and a second state 16B) and metallic or otherwise conductive particles 14. A plurality of metal contacts 34A, 34B, 34C, and 34D are included on the container 32. As illustrated, the metal contacts 34A, 34B, 34C, and 34D are positioned on corners of the container 32. A case conductance can be measured using a measurement circuit connected to the metal contacts 34A, 34B, 34C, and 34D. For example, impedance can be measured by applying a voltage to one or more of the metal contacts 34A, 34B, 34C, and 34D and measuring current. This measurement is indicative of positions and/or movement of the particles 14 within the container 32. Case conductance can be measured for particles 14 that are magnetically sensitive and electrically conductive.

A baseline case conductivity of the container 32 can be known. The system can be calibrated. For example, the particles 14 can be positioned as shown in FIG. 3A under an applied stimulus (e.g., applied magnetic field) when the medium material 16A is in a first state with low mobility, and the conductivity between each combination of two contacts 34A, 34B, 34C, 34D can be measured. These baseline conductivities can be influenced by the materials of the container 32 (e.g., glass) and the medium material 16. The particles 14 can be magnetically sensitive particles that can align relative to a magnetic field and/or lines of flux.

The temperature can increase, which can cause the medium material 16 to transition from the first state to a second state where the particles 14 have higher mobility than in the first state. When the medium material 16B is in the second state, the same stimulus (e.g., as shown a magnetic field source 38 can apply a magnetic field) causes the particles 14 to move to the positions shown in FIG. 3B. A change in resistivity can indicate movement and/or positions of the particles 14. By measuring current using metal contacts 34A, 34B, 34C, 34D, positions and/or movement of the particles 14 can be determined based on the change in resistivity or conductivity due to movement of the particles 14 from the positions shown in FIG. 3A to the positions shown in FIG. 3B. This change in resistivity or conductivity is indicative of movement in response to the magnetic field applied by the magnetic field source 38, which is indicative of phase change of the medium material 16 allowing movement under that stimulus, which in turn is indicative of crossing the phase change temperature threshold. The change in resistivity can thus provide an indication of temperature indicating that temperature is in a range for the medium material 16B to be in the second state. This change of state may cause a stable change (such as movement of particles under stimulus) that is not reversed upon a reversal of the state change. Such a change of state can be used to monitor that the cold chain (e.g., in food or pharmaceutical transport) has not been broken and/or that cold storage conditions have been maintained, or conversely that a maximum safe temperature has been exceeded at some point.

The magnetic field source 38 can apply a magnetic field to cause the particles 14 to move to the positions shown in FIG. 3C when the medium material 16B is in the second state. By measuring current using metal contacts 34A, 34B, 34C, 34D, positions and/or movement of the particles 14 can be determined based on the change in resistivity due to movement of the particles 14 from the positions shown in FIG. 3A to the positions shown in FIG. 3C. The change in resistivity can provide an indication of temperature indicating that temperature is in a range for the medium material 16 to be in the second state.

In certain applications, a system can include a magnetic field source that applies a magnetic field to particles while phase change material is in different states. The magnetic field source can be in a fixed or stationary position in some instances. When phase change material changes phase, the magnetic field source can cause particles within a container to move as a result of the increased mobility of particles in the new phase of the phase change material. One or more sensors can detect this movement of the particles.

FIGS. 4A and 4B illustrate a system that senses temperature based on movement of particles 14 within a container 12 according to an embodiment. In FIG. 4A, the medium material 16A is in a first state where the particles 14 are stationary. The medium material 16A can be a film or gel that is solid at particular temperature corresponding to the first state. A magnet 48 of the system does not cause the particles 14 to move in the first state. The magnet 48 can be a relatively large magnet. In some applications, the magnet 48 can have a stationary position.

At a threshold temperature above the temperature corresponding to the first state, the medium material 16B can become a gel or a liquid in a second state in which the particles 14 are mobile. The particles 14 can move from the initial position shown in FIG. 4A to the position shown in FIG. 4B in the second state. The magnet 48 can cause the particles 14 to cluster. Sensors 42 and 44 can be integrated with the container 12. The sensor 42 can detect particles 14 when the particles 14 are in the position shown in FIG. 4B. The sensor 42 can be any suitable sensor to detect movement and/or position of the particles 14, such as a magnetic sensor, a conductive sensor, or the like. As illustrated in FIGS. 4A and 4B, sensors 42 and 44 can be positioned at opposing ends of a container 12. One or more sensors can be located at any suitable position for detecting movement and/or position of the particles 14. In some embodiments, the magnet 48 can be electrically deactivated or moved to allow redistribution of the particles and changing the medium material 16B back to the first state with temperature lowering for resetting the device.

Particles can be embedded in and/or positioned over a medium material such that the medium material changing state causes the particles to move. Such movement can occur due to gravity and temperature without another external stimulus.

FIGS. 5A to 5D are schematic side or cross-sectional views of a system in which particles 14 within a medium material 16 move in response to an increase in temperature according to an embodiment. FIG. 5A illustrates an initial state where the particles 14 are positioned in a fixed position within the medium material 16A. Above a threshold temperature, the particles 14 can begin to move within the medium material 16B to the positions illustrated in FIG. 5B. The medium material 16 can change state to allow the particles 14 to move from the position shown in FIG. 5A to the position shown in FIG. 5B. Gravity can be a stimulus to move the particles 14 after the change in temperature increases the mobility of the particles 14 within the medium material 16. Accordingly, the movement of the particles 14 can result from the combination of gravity and temperature.

With the temperature above the threshold temperature, the particles 14 can move to the bottom of the container 12 over time to the position shown in FIG. 5C. After the temperature cools down below the threshold temperature, the particles 14 can be held in a new position that is different from the initial position. The new position can be detected in accordance with any suitable principles and advantages of particle detection disclosed herein.

The orientation of the container 12 can be changed to adjust positions of the particles 14 relative to a bottom of the container 12. This can reset the particles to the initial position as shown in FIG. 5D. The orientation can be changed by flipping the container 12 upside down. The orientation of the container 12 can be changed after all particles 14 are at or near the bottom of the container 12. The orientation of the container 12 can be changed for resetting when temperature is below the threshold temperature and the particles 14 are not mobile in the medium material 16. The actual shape of the container 12 can be optimized depending on the specifications of the application.

Figures 5E, 5F:
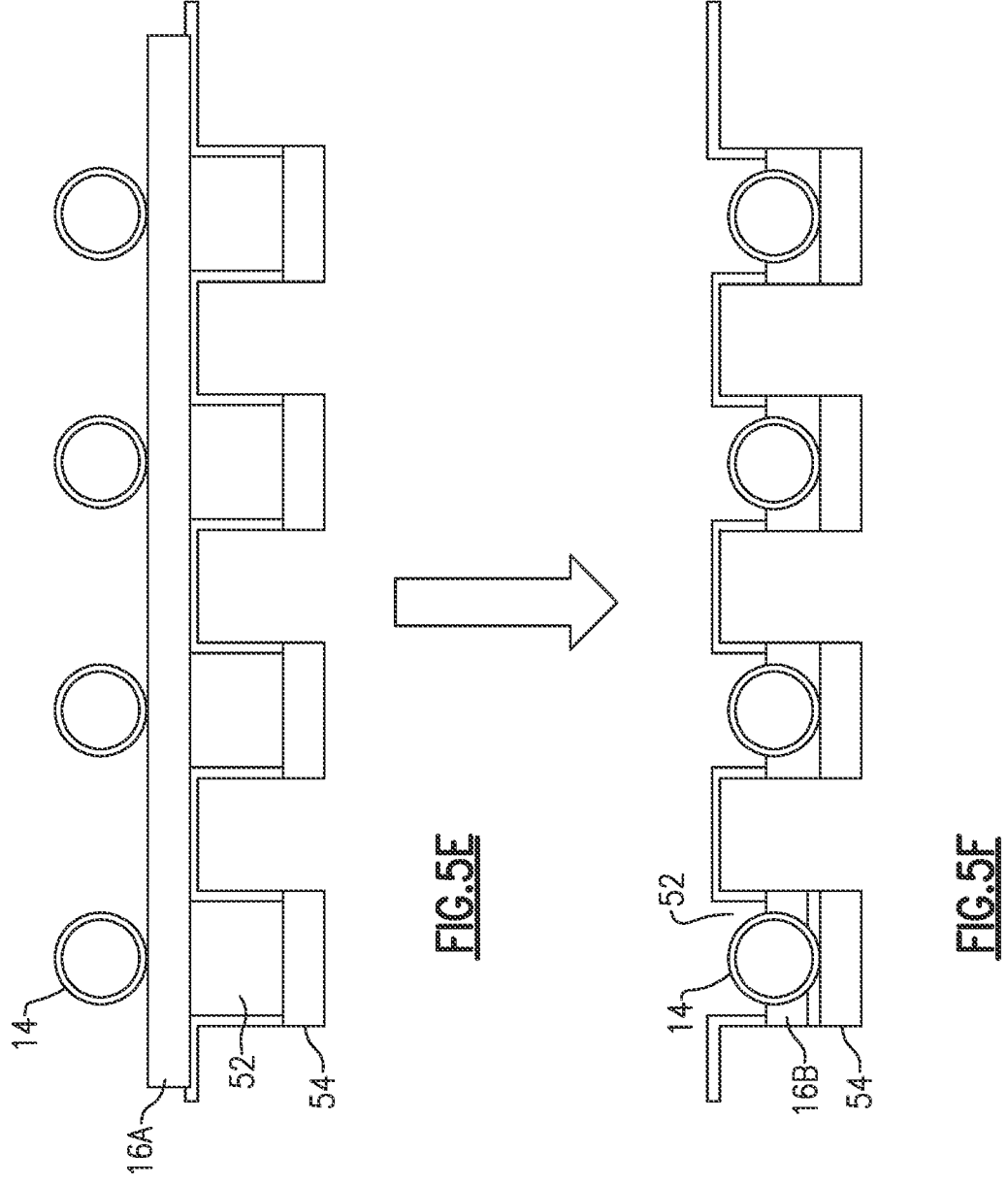
FIGS. 5E and 5F are schematic side or cross-sectional views of a system in which particles move in response to a medium material changing phase due to an increase in temperature according to an embodiment.

FIGS. 5E and 5F illustrate a system in which particles 14 move in response to a medium material 16 changing state due to an increase in temperature according to an embodiment. The medium material 16A is in a first state at a particular temperature in FIG. 5E. In the first state corresponding to FIG. 5E, the medium material 16A is solid or highly viscous gel to prevent the particles 14 from passing therethrough. The particles 14 are suspended over respective recesses 52 in FIG. 5E. In certain instances, the particles 14 can be positioned over respective recesses 52 as illustrated. In some instances, there can be a sufficient number of particles 14 such that it is likely that at least some particles 14 are located over e recesses 52. The recesses 52 can be in a container. The shapes and dimensions of the particles and recesses can be optimized depending on the specifications of the application.

When the temperature increases to or above a threshold temperature, the medium material 16 transitions to a second state. In the second state, the medium material 16B is a liquid. The medium material 16 changing state causes the particles 14 to descend into respective recesses 52. The change of state itself causes the particles 14 to move in the system shown in FIGS. 5E and 5F. The movement of the particles 14 can result from the combination of the temperature and gravity. No active magnetic or electrical stimulus is needed to move the particles 14 from the position shown in FIG. 5E to the position shown in FIG. 5F, such that gravity alone can provide the stimulus for particle movement in response to state change. FIG. 5F illustrates the particles 14 in recesses 52 after the medium material 16B has transitioned to the second state.

The particles 14 being in the recesses 52 can indicate movement from an initial position above the recesses 52. Sensors 54 can detect the particles 14 in recesses. This detection indicates that the temperature has reached the threshold temperature for the medium material 16 to transition to the second state. Furthermore, even if the temperature increases in the meantime to rise above the threshold, the particle positions can serve as an indication that the threshold temperature has been reached in the past, which is also true of other embodiments described herein. For example, such a system can operate without power during shipping of perishable or other temperature sensitive articles, and power only applied for interrogation of sensors after shipping. The location of the particles 14 can be an indication that the goods were subjected at some point to temperatures above the threshold temperature. The sensors 54 can be any suitable sensors to detect that the particles 14 are in the recesses 52. For example, the sensors 54 can include a magnetic sensor, a conductive sensor, or the like. As illustrated in FIGS. 5E and 5F, sensors 54 can be positioned under recesses 52. One or more sensors can be located at any suitable position for detecting that the particles 14 are in the recesses 52.

Figures 5G, 5H, 5I:
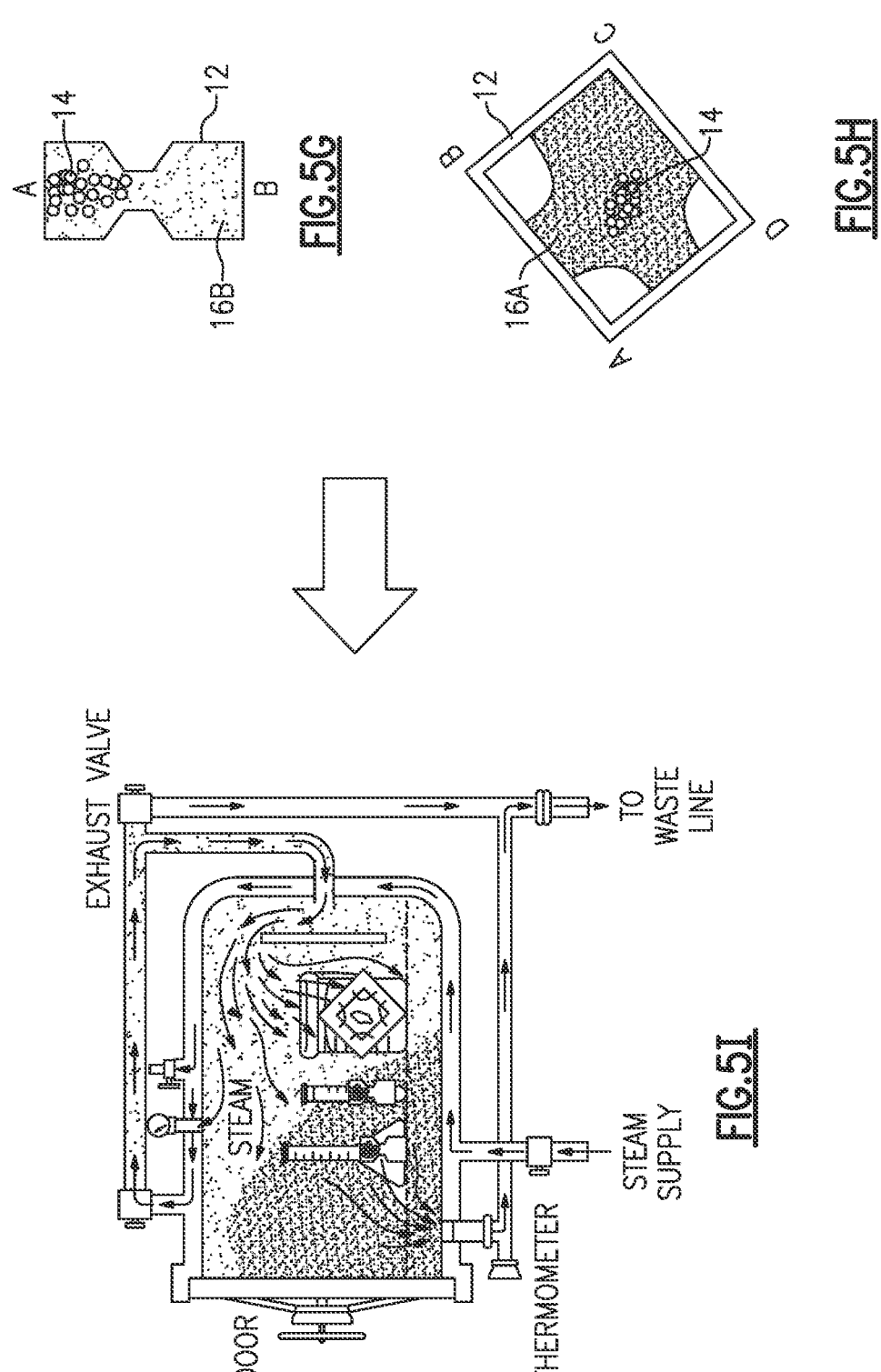
FIGS. 5G and 5H are schematic views of containers in which particles move within a medium material in response an increase in temperature according to embodiments.
FIG. 5I is a schematic side or cross-sectional view of a sterilization system in which containers of FIGS. 5G and 5H are attached to objects according to an embodiment.

FIGS. 5G and 5H are schematic views of containers 12 in which particles move within a medium material in response an increase in temperature according to embodiments. The container of FIG. 5G corresponds to the container shown in FIG. 5B. FIG. 5H is a schematic plan view of a container 12 that includes a substrate containing channels, particles 14, and medium material 16. The channels that can accommodate movement of the particles 14 in different directions. Particle movement in the container 12 of FIG. 5H can depend on the orientation of the container when the particles 14 are mobile. For example, particle movement can depend on the orientation of the container 12 after the medium material 16 changes phase and the particles 14 are mobile. Different physical shapes of part of the container can be used so that when the particles 14 are mobile within the medium material 16, the particles 14 can move in response to a stimulus (e.g., gravity) in a particular direction such that a particle or cluster of particles 14 can be detected. The embodiment of FIG. 5H can measure temperature by way of particle movement under the influence of gravity regardless of the orientation of the container 12 during the temperature change.

The containers of FIGS. 5G and 5H can be used in a variety of applications. One example application is sterilization. Steam can be used for sterilization because steam is non-toxic and can be cost-effective, fast and efficient. When performing sterilization, it can be important not to place different materials inside an autoclave. Each type of material can have its own time and temperature for sterilization, depending on its porosity, texture and/or other characteristics. Some non-limiting examples of materials, temperatures and times for sterilization in autoclave include: surgical material for at least 20 to 30 minutes at 121° C., glass items (e.g., laboratory flasks) for 20 minutes at 121° C., cotton garments and fabrics for 30 minutes at 121° C. Sterilization can be implemented for objects in medical applications, for example.

FIG. 5I is a schematic side or cross-sectional view of a sterilization system in which containers 12 of FIGS. 5G and 5H are attached to objects or trays according to an embodiment. These containers 12 with particles in medium material are attached to objects or trays holding objects undergoing sterilization. A phase change medium material can enable the particles to move above a specific temperature, which can be related to the sterilization temperature/profile. This can enable verification that the object or tray of objects went through a sterilization process. Different medium materials can be used to detect different threshold temperatures for different objections in certain applications. For the sterilization verification example, the threshold temperature need not be strictly matched to the sterilization temperature, and instead can simply represent an elevated temperature below the sterilization temperature but sufficiently above ambient temperatures that it can serve as an indication that the object or tray has been subjected to an elevated temperature. The auto-clave itself can have its own safety systems to ensure that the sterilization process has reached safe sterilization temperatures. The shapes of the containers and particles can be optimized depending on the specifications of the application.

A system can include an integrated antenna to wirelessly transmit information associated with temperature and/or an applied magnetic field. One or more antennas can be integrated with a container that includes particles and phase change material. For example, the one or more antennas can be included on a surface of the container. The one or more antennas can be included in any other part of a system that includes a container with particles. The one or more antennas can include particles in a medium material such that if temperature exceeds a threshold, the one or more antennas can no longer function and/or vanish. In such a case, interruption a wireless signal from the one or more antennas can indicate that the threshold temperature has been exceeded at some point in time. Conversely, a system can be devised such that the antenna only forms or is connected to a signal and begins transmitting after movement of the particles following exceeding a threshold temperature. For example, the design of the container 12 and stimulus can be designed to move particles into a location where it completes an electrical circuit connecting a signal source to an antenna.

FIG. 6A illustrates an example system 60 with at least one antenna 62 integrated with a container 12 according to an embodiment. The system 60 includes a container 12 with an integrated magnetic sensor 22 like the systems of FIGS. 2A and 2B. The system 60 additionally includes the integrated antennas 62 relative to the system shown in FIGS. 2A and 2B. One or more antennas 62 can wirelessly transmit information associated with temperature and/or magnetic field. The one or more antennas 62 can be in communication with the magnetic sensors 22.

FIG. 6B illustrates two antennas 62 on a surface of the container 12. As illustrated, the antennas 62 are on an outer surface of the container 12. The antennas 62 can each include a coil.

Above a specific temperature of the medium material 16, the particles 14 are mobile. The sensors 22 included in the system 60 can detect the movement or change in position of the particles 14. The movement can indicate that the temperature is in a range for the particles 14 to be mobile in the medium material 16. One or more output signals from sensors, such as the magnetic sensors 22, can be processed by a measurement circuit. An output signal of the measurement circuit can be upconverted by a transmitter and transmitted via one or more antennas 62. The one or more antennas 62 can wirelessly transmit information indicative of temperature. The system 60 can include an encryption circuit that encrypts information from sensors such that the one or more antennas 62 wirelessly transmit encrypted information. In some instances, further processing of the wirelessly transmitted temperature information can be performed external to the system 60.

A plurality of systems 60 can be included in an environment to monitor temperature. FIG. 6C illustrates an example embodiment where systems 60A, 60B, and 60C can monitor temperature in an environment, wherein each of these systems can be a system 60. Although three systems 60A, 60B, and 60C are shown for illustrative purposes, any suitable number of such systems can be used for a particular application. Each of the systems 60A, 60B, and 60C can monitor temperature in a different area of the environment. A larger container 64 can include fluid 66 to be monitored. The larger container 64 can be a tank or a vat, for example. Movement of particles within one or more of the systems 60A, 60B, and 60C can indicate temperature in different areas of the larger container 64. Also, although FIG. 6C shows systems 60A, 60B and 60C suspended within the fluid contained in a tank or vat, these systems could also be incorporated, fixed or embedded within the tank itself at specific points. The quantity, locations and/or construction of the systems can be optimized depending on the specifications of the application.

Detecting temperature with systems 60A, 60B, and 60C can provide a variety of useful information. For example, such temperature detection can provide information regarding a temperature profile of the fluid 66 within the container 64. This information can be indicative of a maturity and/or stage of the fluid 66 and/or a process.

Systems 60A, 60B, and 60C can indicate that a particular area within an environment has reached a threshold temperature (e.g., maximum operating temperature or minimum operating temperature) in some applications. Movement of the particles 14 in a system 60A, 60B, and/or 60C can indicate that the temperature is above a threshold, such as a maximum operating temperature. Then a high threshold signal (e.g., an alarm signal) can be wirelessly transmitted from a system 60A, 60B, and/or 60C that senses the particle movement. On the other hand, lack of movement of the particles 14 in a system 60A, 60B, and/or 60C can indicate that the temperature is below a threshold, such as a minimum operating temperature. Then a low threshold signal (e.g., an alarm signal) can be wirelessly transmitted from a system 60A, 60B, and/or 60C that sense the lack of particle movement.

In some instances, different sensor systems can be used to detect different temperature ranges and/or have different sensitivities. For example, different particle sizes and/or different phase change materials can be used in different sensor systems within an environment, such as a relatively larger container.

Temperature monitoring in accordance with any suitable principles and advantages discussed with reference to any of FIGS. 6A to 6C can have a variety of applications. Example applications include without limitation biobag applications, food, medicine or beverage storage or transport applications, biosensing applications, and the like.

A plurality of containers including particles can be used for temperature sensing. Containers can include different medium materials. Whereas a single container may be configured to provide a binary output of whether the container is or has been above or below a threshold temperature in certain applications, based on detecting movement and/or lack of movement of particles within the containers with different medium materials, temperature can be detected with more precision than detecting temperature based on movement of particles within a single container with a binary output. Thus, even for devices configured only for binary determination of temperatures above or below a threshold temperature, systems comprising multiple such devices with different mediums and thus different temperature thresholds can provide more information about temperature ranges.

Figure 7:
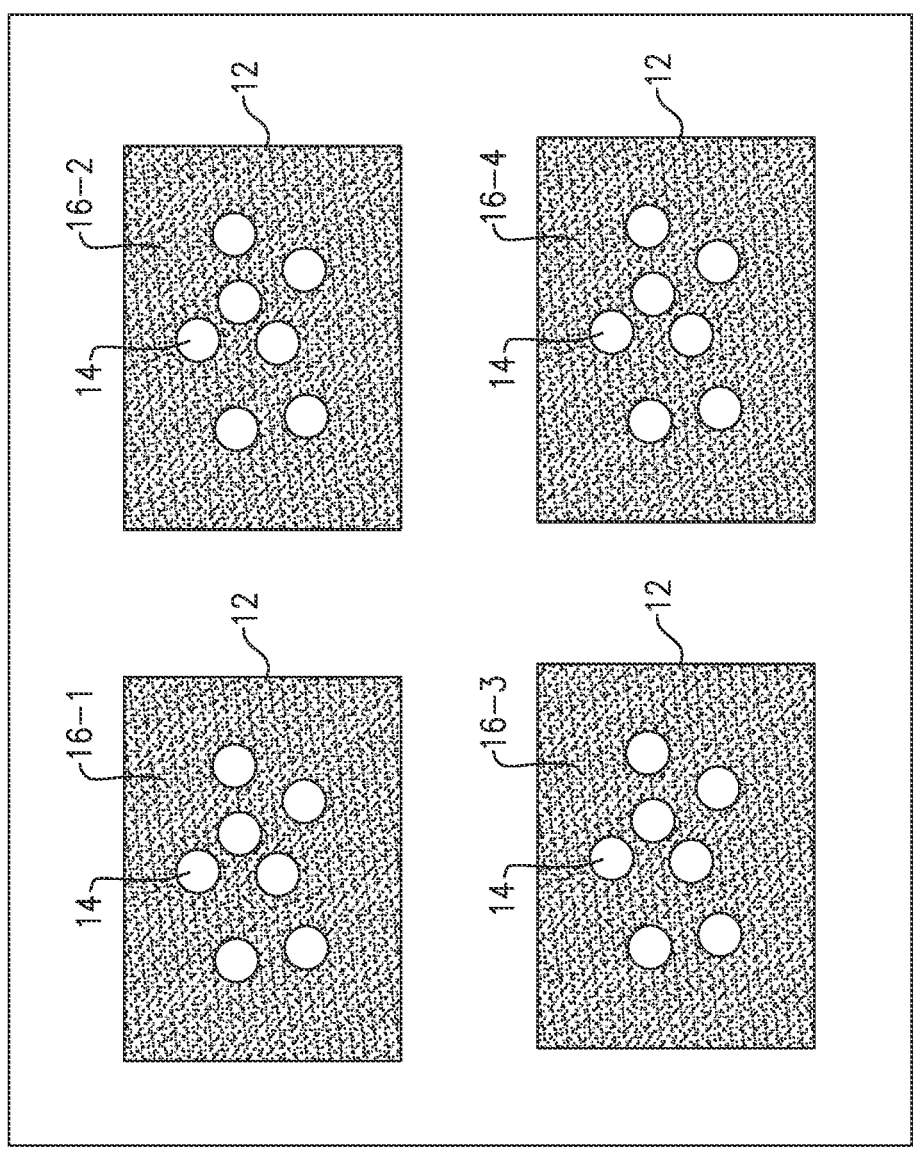
FIG. 7 is a schematic plan view of a system that includes a plurality of containers with particles in different medium materials according to an embodiment.

FIG. 7 illustrates a plurality of containers 12 with particles 14 in different respective medium materials 16-1, 16-2, 16-3, and 16-4 according to an embodiment. The containers 12 can be arranged in an array. The different medium materials 16-1, 16-2, 16-3, and 16-4 can have different properties, such as different melting points, different vaporization temperatures, etc. The different containers 12 can be positioned sufficiently close to each other such that they experience a similar temperature. Temperature can be detected based on movement or lack of movement of the particles in the containers 12. For example, when movement of particles 14 is detected in containers 12 with medium materials 16-1, 16-2, and 16-3 and no movement of particles 14 is detected in the container with medium material 16-4, this indicates that temperature is in a range from (a) above the highest temperature that causes one of the medium materials 16-1, 16-2, and 16-3 to transition to a state in which particles 14 are mobile to (b) below the temperature at which the medium material 16-4 transitions to a state in which the particles 14 are mobile. Such temperature detection is more accurate than detecting temperature based on movement of particles 14 in a single one of the containers 12, as such temperature detection can provide temperature ranges with both upper and lower limits. A measurement circuit can process outputs of sensors associated with each of the containers 12 and output an indication of temperature.

Containers

In certain embodiments, the container is a sealed enclosure made from glass. This can enable the enclosure to be sealed similar to the technologies applied for assembling hermetically sealed semiconductor packaging. According to some embodiments, the container can be flexible, include a laminate, a ceramic, glass or a metal. The container can be an injection molded container in some applications. Such an injection molded container can include acrylonitrile butadiene styrene (ABS), polycarbonate (PC), polypropylene (PP) or high temperature plastics, such as liquid crystal polymer (LCP), polyphenylene sulfide (PPS), etc. The container can include several different layers.

In certain applications, a hermetically sealed enclosure can be fabricated in a non-semiconductor/wafer fabrication environment. Some or all of such an enclosure can be exposed in a harsh environment. Examples of harsh environments include without limitation acidic environments, corrosive environments, and high temperature environments. Fabricating the enclosure and including particles for detecting a temperature and/or magnetic field within the enclosure can be carried out in a separate manufacturing location and/or process from the manufacturing location of an integrated circuit that is integrated with the enclosure. At a later stage of manufacturing, such as a packaging stage, the enclosure can be integrated with the integrated circuit. For example, the enclosure can be incorporated within a module or stacked with an integrated circuit that includes semiconductors and/or supporting circuitry and systems.

A container can include one or more integrated structures. Examples of containers with integrated structures will be discussed with reference to FIGS. 8A to 8C. Any suitable principles and advantages and/or structures of the containers of FIGS. 8A to 8C can be implemented together with each other as suitable.

Figure 8A:
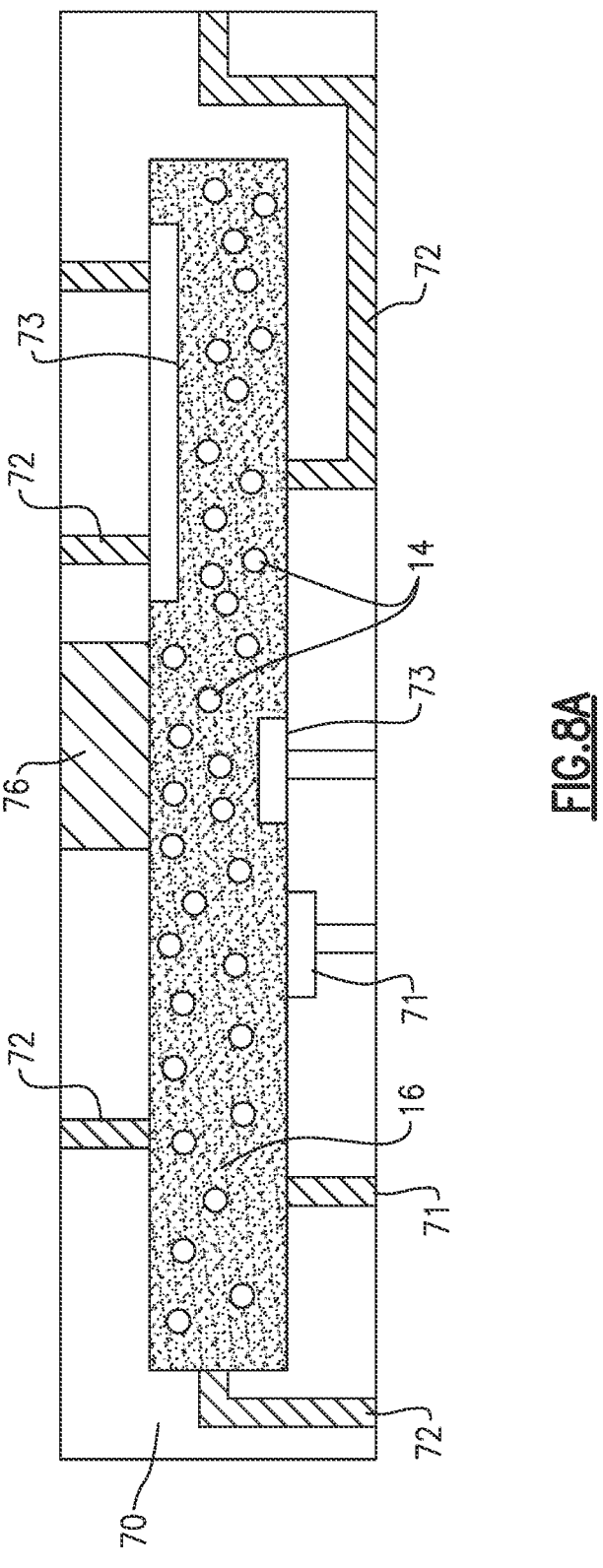
FIG. 8A is a schematic cross-sectional view of an example enclosure having a plurality of integrated structures according to an embodiment.

FIG. 8A illustrates an example enclosure 70 having a plurality of integrated structures according to an embodiment. One of more of these structures can be integrated with any of the containers disclosed herein as suitable. As illustrated, the enclosure 70 includes conductive structures 71 and 72. The illustrated conductive structures 71 include vias and a conductive trace through or on packaging dielectric materials (e.g., printed circuit board (PCB) layers, encapsulating molding materials, etc.). The enclosure 70 can include one or more structures 73 on a surface thereof. For example, a sensor, a conductive trace, or a coil can be included on an inner (as shown) or outer surface of the enclosure 70. One or more structure 73 can alternatively or additionally be embedded within layers of the enclosure 70. The enclosure 70 can include electrically conductive paths 72 from an internal part of the enclosure 50 to external to the enclosure 70, which can also be provided in the form of traces, vias and/or lead frame materials. The enclosure 70 also includes particles 14 within a medium material 16. The particles 14 can be one or more of conductive, magnetically sensitive, paramagnetic, ferromagnetic, or ferrimagnetic materials. The medium material 16 can be any suitable material disclosed herein. Above a certain temperature, the medium material 16 can be a fluid, a liquid, a low viscosity gel, a paste, a foam, or a polymer that permits relative movement of the particles in response to magnetic fields. The medium material 16 can be electroactive. The enclosure 70 can include an optical window 76 such that a cluster or movement of particles 14 can be optically detected.

Figures 8B, 8C:
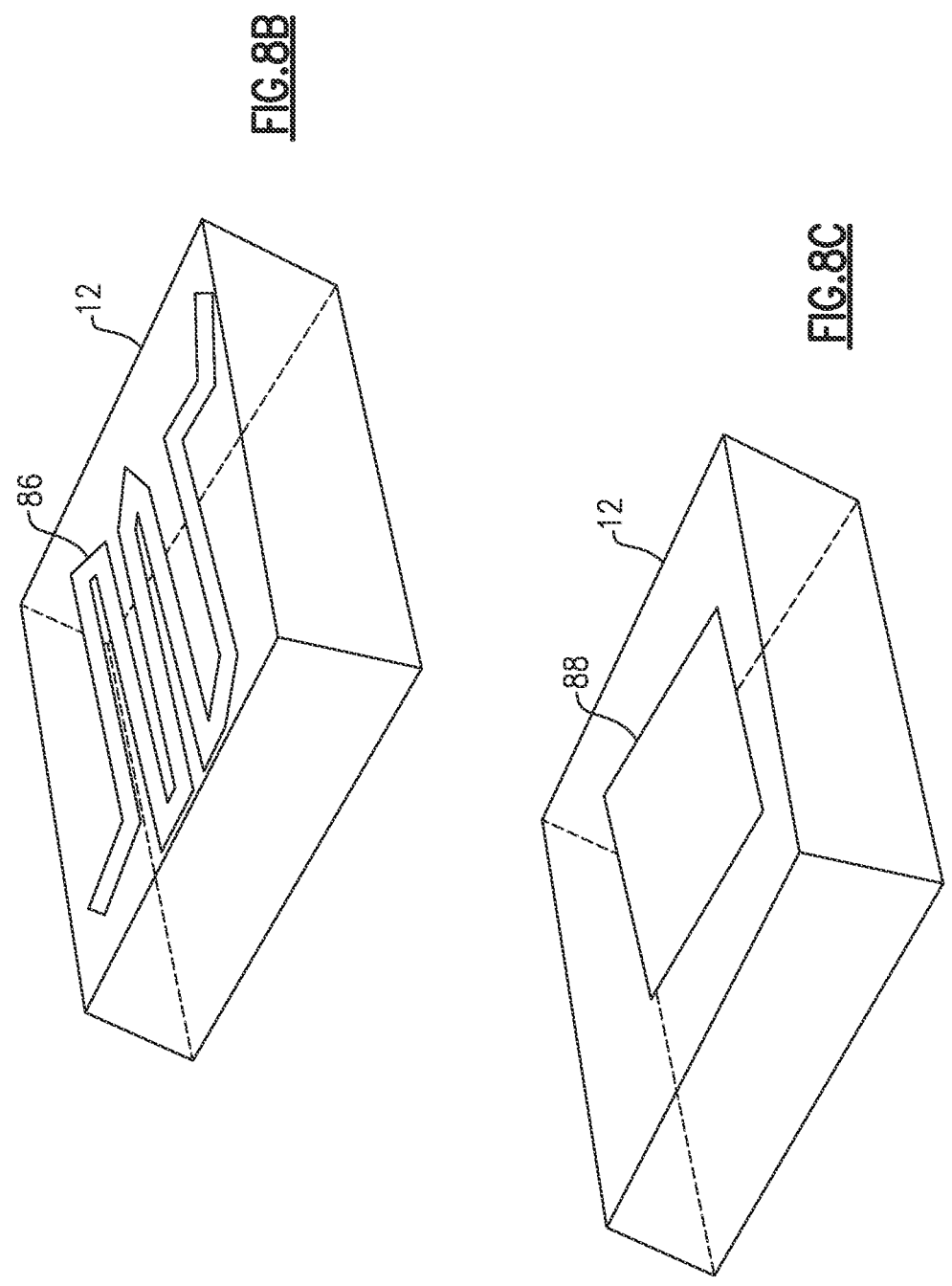
FIG. 8B is a schematic isometric view of an example container with an integrated heating element according to an embodiment.
FIG. 8C is a schematic isometric view of an example container with an integrated piezoelectric element according to an embodiment.

FIG. 8B is a schematic isometric view of an example container 12 with an integrated heating element 86 according to an embodiment. The heating element 86 can be included on and/or within one or more layers of the container 12. The heating element 86 can be located in any suitable position of the container 12, such as on a top and/or a bottom of the container. The heating element 86 can be a resistive heating element, for example. Heat generated by the heating element 86 can affect medium material 16 within the container 12 and cause particles in the medium material to move. In certain applications, the heating element 86 can heat the medium material 16 to reset the positions of the particles. The heat itself can provide impetus to move particles to a reset (e.g., randomly distributed) position, or the stimulus (e.g., gravity, electrical or magnetic field) can be applied in a different orientation to reset the particle positions while the heating element 86 ensures mobility of the particles within the medium material 16. In another embodiment, alternating magnetic fields can be applied to agitate the particles and generate heat through friction, allowing a phase change or a reduction in viscosity to permit resetting the device for temperature detection.

FIG. 8C is a schematic isometric view of an example container 12 with an integrated reset mechanism, in particular a piezoelectric element 88 according to an embodiment. The piezoelectric element 88 can include piezoelectric material included on and/or within one or more layers of the container 12. The piezoelectric element 88 can be located in any suitable position of the container 12, such as on a top and/or a bottom of the container. The piezoelectric element 88 can be activated to physically agitate particles in medium material within the container when the particles are mobile. This agitation can reset the positions of the particles. A combination of a reset mechanism and a heat source, such as the piezoelectric element 88 of FIG. 8C and the heating element 86 of FIG. 8B, can be employed in separate layers in and/or on the container 12 to ensure the medium material 16 is in a state to allow ready particle movement during reset.

Agitation can also be employed to increase the sensitivity of detecting particle movement. The agitation from the piezoelectric element 88 can enhance detection of particle movement to detect a phase change of the medium material. The agitation from the piezoelectric element 88 can enhance detection of particle movement to detect a change in viscosity of the medium material. With the piezoelectric element 88, there can be intermittent agitation and detection of particle movement. Intermittent detection of particle movement over time can be used to detect whether a threshold temperature has been exceeded (e.g., in cold storage applications) and/or whether a target temperature level has been attained (e.g., in sterilization applications).

The medium material 16 can include a film or gel that becomes softer and/or more malleable above a certain temperature such that particles 14 move. A piezoelectric element or other agitation element can pulse the film and/or the particles to detect whether a temperature has been reached.

Figure 8D:
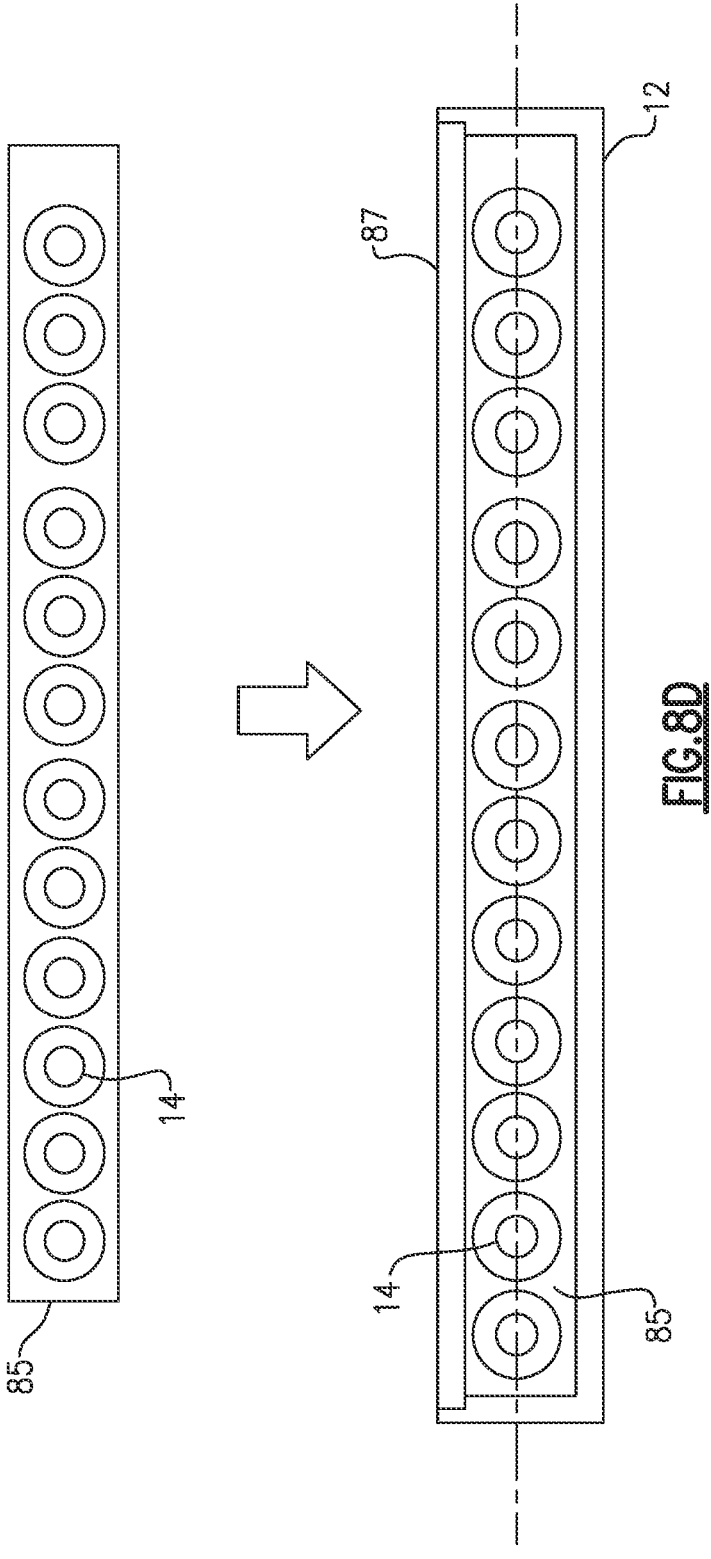
FIG. 8D is a schematic side or cross-sectional view of an example container enclosing a film with embedded particles, where the container has flexible surface according to an embodiment.

FIG. 8D illustrates particles in a film 85, along with a container 12 with a flexible surface 87 around the film 85 and the particles 14. The container 12 of FIG. 8D can be used with any suitable principles and advantages disclosed herein, such as piezoelectric pulsing. Although a flexible top surface 87 is illustrated in FIG. 8D, any suitable surface of the containers disclosed herein can be flexible and/or a container can include two or more flexible surfaces in certain applications.

In certain applications, a container can include an integrated patterned structure that is conductive and/or magnetically sensitive. The patterned structure can be used for sensing in some instances. The patterned structure can be used for biasing in some instances. FIGS. 9A and 9B illustrate example enclosures with patterned structures. The patterned structures are shown in side view and in plan view in these figures. FIG. 9A illustrates an enclosure 92A with a patterned structure 94A. FIG. 9B illustrates an enclosure 92B with a patterned structure 94B. Patterned structures 94A and 94B are two examples of conductive and/or magnetically sensitive patterned structures. Patterned structures can have any suitable shape for a particular application.

Figure 9C:
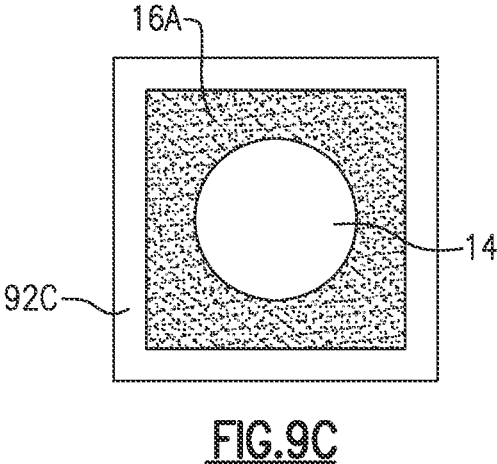
FIGS. 9C and 9D are schematic plan views of an example enclosure with a magnetically sensitive particle in phase change material according to an embodiment.
Figure 9D:
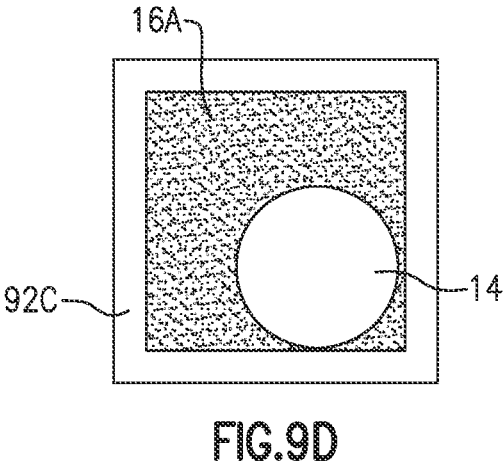

FIGS. 9C and 9D are schematic plan views of an example enclosure 92C with a magnetically sensitive particle 14 in phase change medium material 16 according to an embodiment. In FIG. 9C, the phase change medium material 16A can initially be provided in a first state (e.g., a solid state) where a magnetically sensitive particle 14 in the phase change medium material 16A is in a fixed position. The phase change medium material 16A can be solid at room temperature, for example. Above a threshold temperature, the phase change medium material 16 can change to a second state (e.g., a liquid state) where the magnetically sensitive particle 14 is mobile. The enclosure 92C can include one or more suitable integrated structures, such as one or more magnetic sensing structures, one or more conductive traces, one or more conductive vias, etc. Traces can be provided within the enclosure 92C to detect contact or changes in position of the particle 14 that can occur with the phase change, allowing electrical detection of the phase change as an indication of crossing the threshold temperature.

Containers for particles can have any suitable shape and size for a particular application. Enclosures containing particles for temperature detection can be shaped to enhance detection of movement of the particles. Enclosures containing particles for magnetic field detection can be shaped to enhance and/or optimize sensing of particle positions or movement in response to stimuli, such as magnetic fields and/or magnetic bodies. FIGS. 10A, 10B, 10C, 10D, and 10E illustrate example containers 102A, 102B, 102C, 102D, and 102E, respectively, with various cross-sectional shapes. Different fluid enclosure shapes can enable proximity of sensors and/or detection of particle movement for certain applications. Different fluid enclosure shapes can enable proximity of magnetic bodies and/or fields to be adjusted for particular applications.

An enclosure can be shaped for desired particle movement paths/speeds/distance in the presence of the stimulus that causes particle movement when the temperature is above the phase change threshold, such as an applied magnetic field. For example, FIGS. 10F, 10G, and 10H illustrate a plan view of a container 102F with a constricted region. Over time and/or with a minimal threshold field, particles can flow through the constricted region based on exposure to an applied magnetic field and the particles being mobile in a medium material. For instance, in FIGS. 10G and 10H, particles 14 are magnetically sensitive and flow toward a magnetic field source 108 that has an associated magnetic field. A biasing structure 105 integrated with the container 102F can bring the particles 14 to an initial position. The particles 14 are in the initial position in FIG. 10F. The biasing structure 105 can be deactivated and the medium material in which the particles are embedded can be at a sufficient temperature to allow the particles 14 to flow in response to an applied magnetic field. The biasing structure 105 can also be used as a reset mechanism to bring the particles 14 to the initial position, and the temperature lowered to immobilize the particles in the reset position. The container 102F and particles 14 can also be used to detect a cumulative magnetic field exposure based on an amount of particles 14 that move through the constricted region. This cumulative magnetic field exposure can be indicative of an amount of time that the container 102F is above a certain temperature in certain applications. Accordingly, movement of the particles 14 within the container 102F can be used to determine a cumulative temperature exposure profile in such applications.

In some instances, a semipermeable membrane can be included in a narrow side of the container 102F so that the particles 14 find little resistance crossing towards one direction but not the opposite direction. That can allow particles 14 to move to one side and remain there even when the magnetic field is no longer present. If such a membrane is designed accordingly, the particles 14 can be impeded from moving back through the membrane, or moved through the membrane by applying a strong magnetic or electric fields to reset the device.

Magnetically Sensitive Particles

Particles 14 in embodiments disclosed herein can be magnetically sensitive particles. Magnetically sensitive particles can have one or more properties such that the magnetically sensitive particles move in a desired way to the magnetic stimulus when the medium material is a state that permits such movement. For example, magnetically sensitive particles can be constructed, shaped, patterned, or the like so the magnetically sensitive particles respond to a magnetic stimulus in a desired way. As one example, a spiral shaped magnetic particle can respond to a magnetically induced force and move through fluid differently than a spherical or square shaped particle. The viscosity of the fluid and the shape of the magnetically sensitive particle can be balanced for movement of the magnetic particle in response to an applied magnetic field. The magnetically sensitive particles can include a functional coating. The magnetically sensitive particles can be coated with an electrically conductive material (e.g., gold) such that when a certain amount of particles cluster or align, a conductive path is formed between electrical contacts in a container. The magnetically sensitive particles can be coated with a coating to enhance optical detection, such as a coating to achieve one or more of a desired optical contrast, color, fluorescence, luminescence, or another optical property. In certain instances, magnetically sensitive particles can incorporate a functional coating so as to be chemically inert or to chemically react with a surface or other structure depending on the specifications of the particular application.

In some instances, one or more internal sections of an enclosure can be patterned with magnetic material to detect clusters of particles in specific regions. The shape of magnetically sensitive particles can affect how the magnetically sensitive particles move and cluster in such applications. Depending on the outermost material, magnetically sensitive particles may stick together. In some applications, the magnetically sensitive particles can be coated with a thin material, such as Teflon or another polymer, so that there is little or no potential for the magnetically sensitive particles to stick together and/or cluster for any reason other than a response to a magnetic field or other particle movement stimulus. The enclosure can incorporate one or more conductive vias and connections from the internal surfaces to the external. The enclosure can incorporate one or more optical conduits and/or areas that facilitate optical detection of particle clusters or movement.

Magnetically sensitive particles can be constructed to move and/or respond in different ways. Sensitivity, such as movement, to certain field strengths can be improved with certain particle constructions, shapes, etc. The magnetically sensitive particles can be combined with and/or embedded within non-magnetic material to provide the effect of a partially patterned structure. The combined structure can then be inserted within a phase change medium material (e.g., a fluid, a gel, or a film).

In some instances, magnetically sensitive particles can include an outer coating that is magnetically sensitive. As an example, magnetically sensitive particles can be a polystyrene bead coated with nickel or another magnetically sensitive material. Such magnetically sensitive particles can have an overall density of magnetic material that is lower than a homogenous sphere of magnetically sensitive material. In some other examples, magnetically sensitive particles can have magnetically sensitive core materials and coatings selected to enhance or inhibit interaction with each other and/or the surrounding fluid. For example, the outer coating could be polystyrene, PTFE, Teflon, or some other polymer that can inhibit particles sticking together other than in a desired way as a response to stimulus from a magnetic field.

In certain instances, magnetically sensitive particles have an electrically conductive outer surface. For example, magnetically sensitive particles can be coated with gold. With such magnetically sensitive particles, an electric contact between two electrodes in the container can be closed.

Magnetically sensitive particles can have a coating with one or more specific optical properties in some applications. With such a coating, one or more of a contrast, a color, luminescence or fluorescence can be achieved. The coating with one or more specific optical properties can aid optical detection of magnetically sensitive particles.

As noted above, magnetically sensitive particles can be ferromagnetic, ferrimagnetic, paramagnetic, or diamagnetic. Diamagnetic particles are repelled by a magnetic field. In contrast, paramagnetic and ferromagnetic particles are attracted by a magnetic field. Paramagnetic materials include metals that are weakly attracted to magnets. Examples of paramagnetic materials include lithium, aluminium, tungsten, platinum, and manganese salts. Ferromagnetic particles include one or more suitable ferromagnetic materials, such as iron, nickel, or cobalt. Examples of diamagnetic materials include graphite, gold, bismuth, antimony, quartz, and silver. In certain applications, magnetically sensitive particles are polystyrene (PS) magnetic particles. Polystyrene magnetic particles can be synthesized by embedding superparamagnetic iron oxide into polystyrene. Polystyrene magnetic particles can be positively charged (e.g., by amine modification), unmodified, or negatively changed (e.g., by carboxyl modification).

The magnetically sensitive particles can have any suitable size for a particular application. In certain applications, magnetically sensitive particles are micrometer scale or larger. In some applications, magnetically sensitive particles are millimeter-scale particles. Magnetically sensitive particles can be larger than millimeter-scale. In certain applications, magnetically sensitive particles can have a particle width in a range from about 50 nanometers to 1 millimeter. In some such applications, particle width can be in a range from about 0.5 micron to 100 microns. In some of these applications, particle width can be in a range from about 0.1 micron to 100 microns.

Magnetically sensitive particles can have a shape to influence their movement and/or orientation in the fluid such that their sensitivity to the magnetic field stimulus is enhanced and/or optimized. In certain applications, it may be desirable to have a non-symmetrical magnetically sensitive particle so that the magnetically sensitive particle moves in a particular way when exposed to a magnetic field. A combination of the shape of the magnetically sensitive particle and how the magnetically sensitive particle is embedded or suspended in a fluid/gel can be receptive to magnetic stimuli in particular directions and/or intensities. A particular particle shape combined with a fluid or gel of a particular viscosity can provide a desired sensitivity to a magnetic stimulus. Different particle sizes and shapes can be combined as desired for a range of target sensitivities within a system.

Figures 11A, 11B:
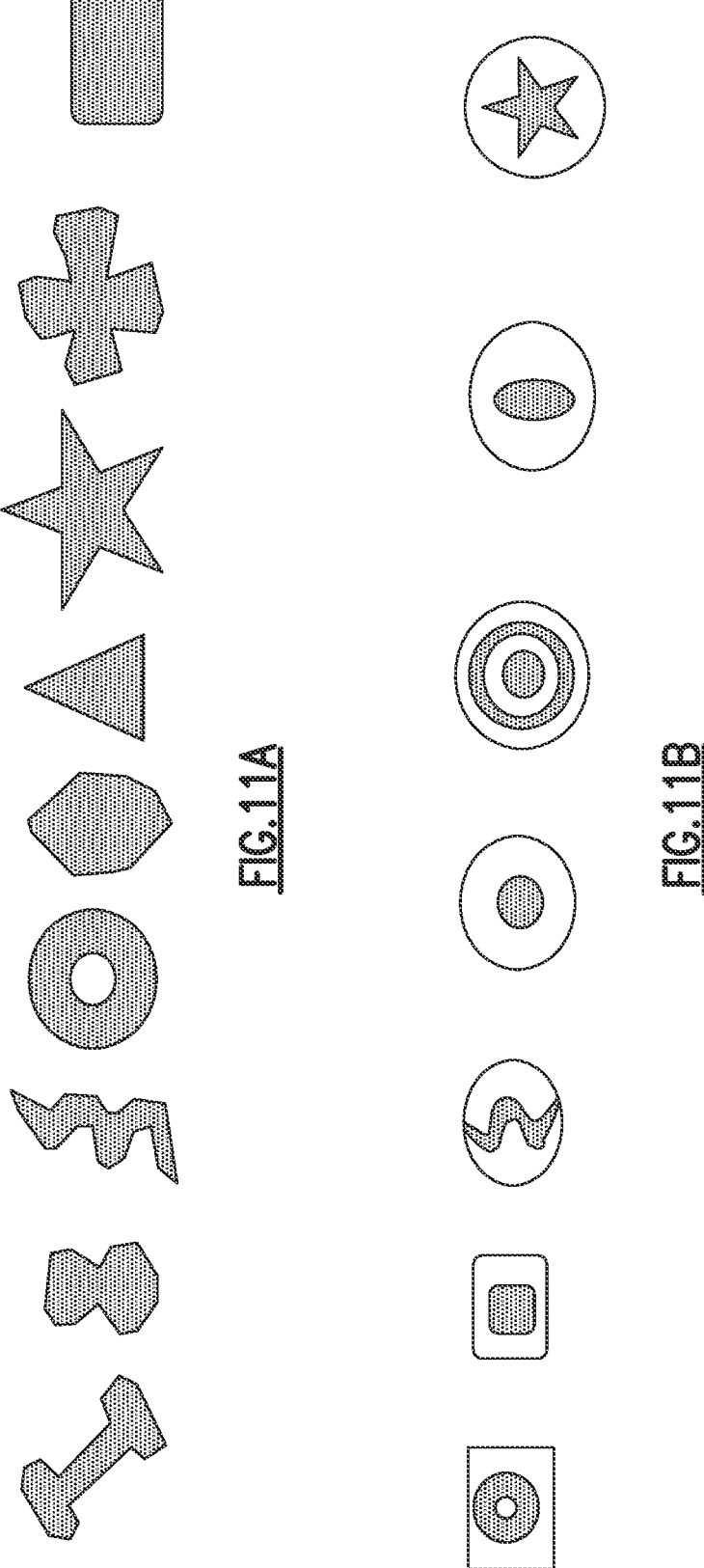
FIG. 11A illustrates example shapes of magnetically sensitive particles.
FIG. 11B illustrates example combined structures with magnetically sensitive particles included within non-magnetic material.

FIG. 11A illustrates example shapes of magnetically sensitive particles. The magnetically sensitive particles can be added to an inert, non-magnetic material to form a combined structure. FIG. 11B illustrates example combined structures with magnetically sensitive particles included within non-magnetic material. Various processes, such as coating, molding, printing, laser cutting, laminating, and the like, can be used to fabricate composite particles incorporating magnetically sensitive particles so that the magnetically sensitive particles react in a desired manner to a magnetic field. For example, with an outer non-magnetic layer, when a number of the composite particles come together they may be held in a cluster by a magnetic field/force. Such composite particles can have non-magnetic material come into physical contact with one or more other composite particles. Such a construction can be desirable to facilitate release of such composite particles from one another in the absence of the magnetic field. For example, spherical particles with magnetic cores and covered with polystyrene/PTFE may be less likely to stick together and may bounce off each other. A combination of particle shape (e.g., spiral shape, propeller shape, etc.) and fluid viscosity in the medium material state 16B that permits particle movement can determine sensitivity and/or speed of a response to a magnetic field stimulus.

Figure 11C:
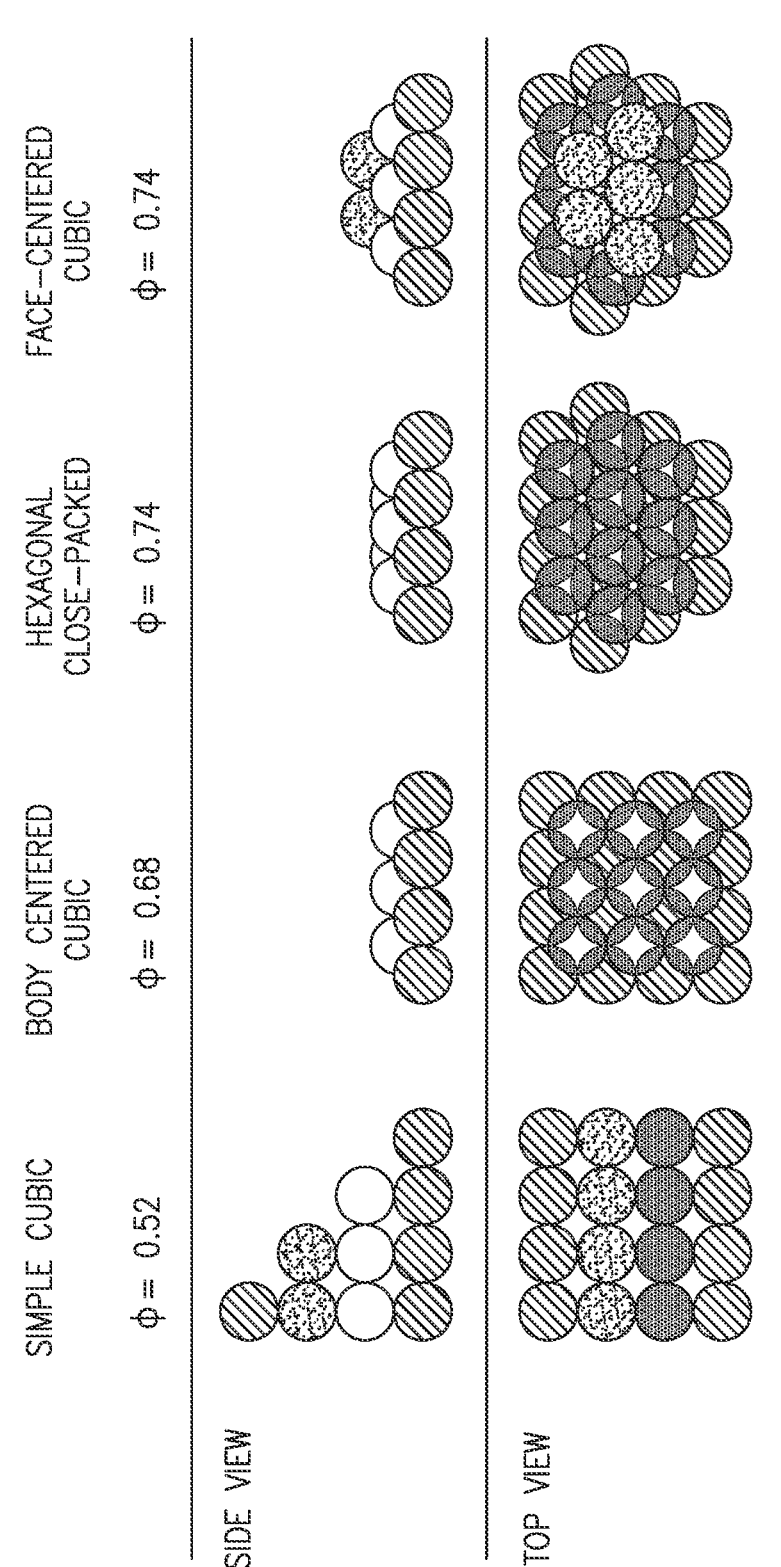
FIG. 11C shows examples of clusters of particles.

Magnetically sensitive particles can have various sizes and densities. If all particles are the same size, a contact surface area can be relatively small. By using a plurality of sizes (e.g., large and small), a bridging structure can have more contact points. This can allow smaller particles to reduce resistance/increase current carrying capability, which may be relevant to some particle movement or position sensing techniques. FIG. 11C shows examples of how combining different types of particles can result in clustering with different shapes, which can be useful for detection purposes.

Systems

Temperature measurement systems can include a container, one or more particles within the container, and a measurement circuit configured to output an indication of temperature based on movement of at least one particle within the container. The container can be integrated with, for example co-packaged with, an integrated circuit. The container can include an electrical connection to the integrated circuit. The integrated circuit can include some or all of the measurement circuit. In some instances, the integrated circuit can also include a sensor that senses position(s) of particles within the container. The sensor can output a signal to the measurement circuit. In some other applications, the measurement circuit can generate a measurement of the temperature and/or applied magnetic field without a separate sensor.

FIGS. 12 to 18 illustrate systems and modules that include a container integrated with an integrated circuit that includes a measurement circuit. Any suitable principles and advantages of these embodiments can be implemented together with each other. Moreover, the embodiments of FIGS. 12 to 18 can be implemented with any other suitable principles and advantages disclosed herein related to containers, particles, and temperature and/or magnetic field measurements disclosed here can be implemented together with any of the embodiments of FIGS. 12 to 18.

Figure 12:
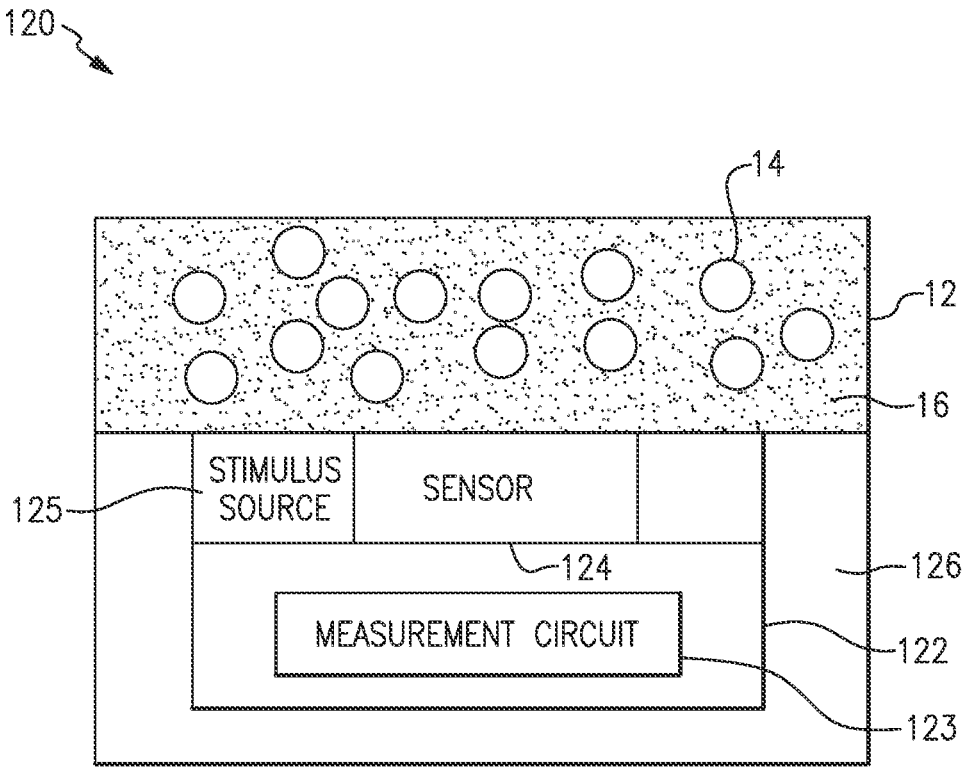
FIG. 12 is a schematic block diagram of a temperature sensing system according to an embodiment.

FIG. 12 is a schematic block diagram of a temperature sensing system 120 according to an embodiment. In the temperature sensing system 120, a temperature measurement, which may be a binary indication of being above or below a threshold phase change temperature or a temperature range, is generated based on movement of particles within a container. The temperature sensing system 120 can additionally generate a magnetic field measurement based on positions of particles within the container. The temperature sensing system 120 includes a container 12 enclosing a medium material 16 and particles 14 within the medium material 16. An integrated circuit 122 is integrated with the container 12. As illustrated, the integrated circuit 122 is vertically integrated with the container 12. The integrated circuit 122 includes a measurement circuit 123. A sensor 124 is also integrated with the container 12. A stimulus source 125 is also integrated with the container 12. A packaging structure 126 can protect the integrated circuit 122 and the sensor 124. The packaging structure 126 can also protect the stimulus source 125. The container 12, the sensor 124, the integrated circuit 122, and the stimulus source 125 can be co-packaged.

The stimulus source 125 can be a source of stimulus for moving the particles 14 in response to the medium material 16 changing phase. The stimulus source 125 can be positioned at any suitable position in the temperature sensing system 120 to provide a stimulus for causing such movement of the particles 14. The stimulus source 125 can be positioned around the sensor 124 (as illustrated). In some other instances, a stimulus source can be interleaved with a sensor. The stimulus source 125 can generate a biasing or internal magnetic field, for example.

The sensor 124 can sense position and/or movement of the particles 14. The sensor 124 can be a magnetic sensor, a capacitive sensor, a MEMS based sensor, an optical sensor, a resistive sensor, or any other suitable sensor that can detect movement and/or positions of the particles 14. The sensor 124 can be configured to detect position or movement of the particles 14 in response to a stimulus when the temperature is above the phase change threshold. For example, the sensor 124 can be configured to detect a change from equally distributed magnetically sensitive particles to multiple clusters. The sensor 124 can be configured to detect a change from equally distributed magnetically sensitive particles to a single cluster having an arbitrary position. In some instances, the sensor 124 can detect a dynamic change of particle position.

The sensor 124 can be separately formed from the integrated circuit 122 and integrated with the integrated circuit 122 by way of packaging. The sensor 124 can be larger than the integrated circuit 122. The sensor 124 and the integrated circuit 122 can be formed by different fabrication processes. As illustrated, the sensor 124 for detecting movement and/or position of magnetically sensitive particles is positioned external to the container 12 and separate from the integrated circuit 122 that includes circuitry of the measurement circuit 123.

In some other embodiments, a sensor can be included within a container. According to various embodiments, a sensor can include elements on an integrated circuit that includes the measurement circuit and also elements external to the integrated circuit. In some embodiments, an integrated circuit can include both a sensor and circuitry of a measurement circuit.

The illustrated integrated circuit 122 includes the measurement circuit 123. In some other applications, circuitry of a measurement circuit can be included both on an integrated circuit and external to an integrated circuit (e.g., as one or more standalone circuit elements, on one or more other integrated circuits, etc.). The measurement circuit 123 generates an indication of temperature based on movement of the particles 14 within the container 12. The measurement circuit 123 can include any suitable circuitry to generate such an output. The measurement circuit 123 can include semiconductor devices, such as silicon devices. The measurement circuit 123 can process an output of the sensor 124 to generate the indication of temperature. The measurement circuit 123 outputs a measurement of the temperature. Such a measurement can indicate a temperature range or simply indicate that the temperature is above or below a threshold temperature.

In some instances, the measurement circuit 123 can generate an indication of temperature based on measurements of particles 14 in different states of the medium material 16 that indicate movement of the particles 14. The measurement circuit 123 can alternatively or additionally generate the indication of temperature based on measurements of the particles in one state of the medium material 16 indicating movement of the particles 14. The measurement circuit 123 can detect movement of the particles 14 based on detecting that at least some the particles 14 are in a different position than an initial position. The measurement circuit 123 can determine a rate or amount of movement of the particles 14 in a response to a stimulus, such as a magnetic stimulus, to generate an indication of temperature. The measurement circuit 123 can store information associated with the medium material 16 and use the stored information to generate the indication of temperature. The measurement circuit 123 can generate an indication of temperature based on movement and/or lack of movement in a plurality of different containers.

In certain applications where particles 14 move within the container 12 in response to an applied magnetic field while the medium material 16 is in a state where the particles 14 are mobile, the measurement circuit 123 can also output an indication of the magnetic field. The indication of the magnetic field can be indicative of one or more of time of exposure to and intensity of a magnetic field, a direction of a magnetic field, an angle of a magnetic field, an intensity of a magnetic field, a rotation of a magnetic field, a profile of magnetically sensitive particles, a time domain change in a magnetic field (e.g., frequency and/or harmonics), or the like. The magnetic field measurement can be made sequentially after determining that the temperature is above the threshold that facilitates movement in the phase change medium material. Where the applied stimulus for particle movement is a known magnetic field, the sensor 124 (including source of known magnetic field) can be protected from external fields by a magnetic shield, and the shield removed for measurement of the external field.

A container including particles can be included in a system in package (SIP). A SIP is an example of a packaged module. The container can be positioned close to a surface of a packaging structure or exposed through an opening in a packaging structure for sensing temperature and/or sensing a magnetic field. This can leave part of the container exposed to an environment while circuitry of the system is protected from the environment. In certain applications, an opening in the packaging structure can leave at least a portion of the container exposed to an external environment. The packaging structure can include a molding material, a sealed cavity or "can," or any other suitable structure to protect integrated circuits.

The particles can move within the container when a medium material in the container is over a certain threshold temperature. A measurement circuit of an integrated circuit of the SIP can output an indication of the temperature based on movement of the particles in the container. In some instances, an applied magnetic field causes particles to move within the container when the medium material is over the threshold temperature. A concentration of particles can produce a discernible electrical change within the system that, in a temperature sensing mode, indicates a temperature or temperature range, and in external field measurement mode can indicate presence/concentration of a magnetic body and/or a magnetic field. In such instances, the measurement circuit can output an indication of an applied magnetic field based on positions of the particles in the container.

Figure 13:
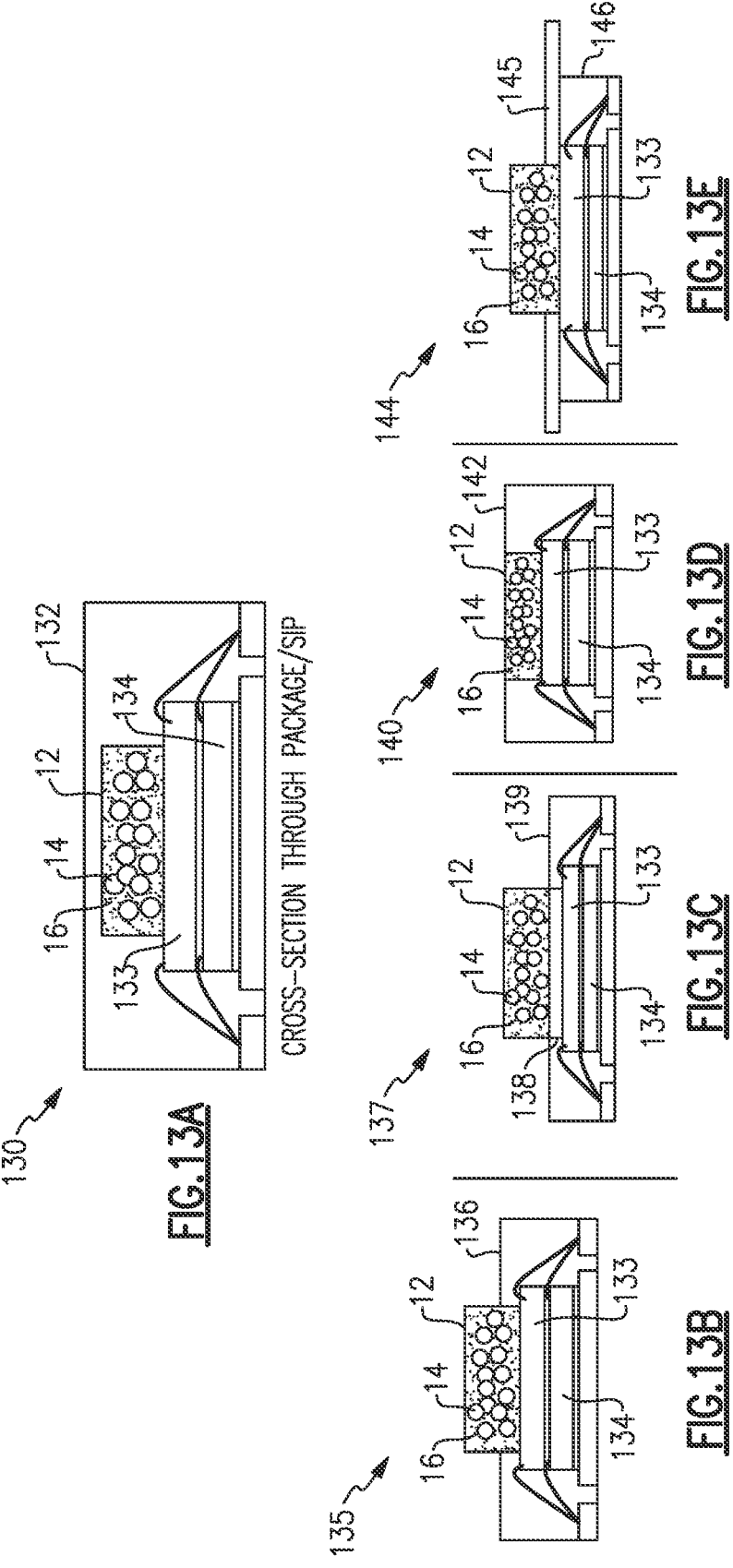
FIGS. 13A, 13B, 13C, 13D, and 13E are schematic cross sections of systems-in-a-package (SIPs) with temperature sensing based on movement of particles in a container according to embodiments.
Figure 14:
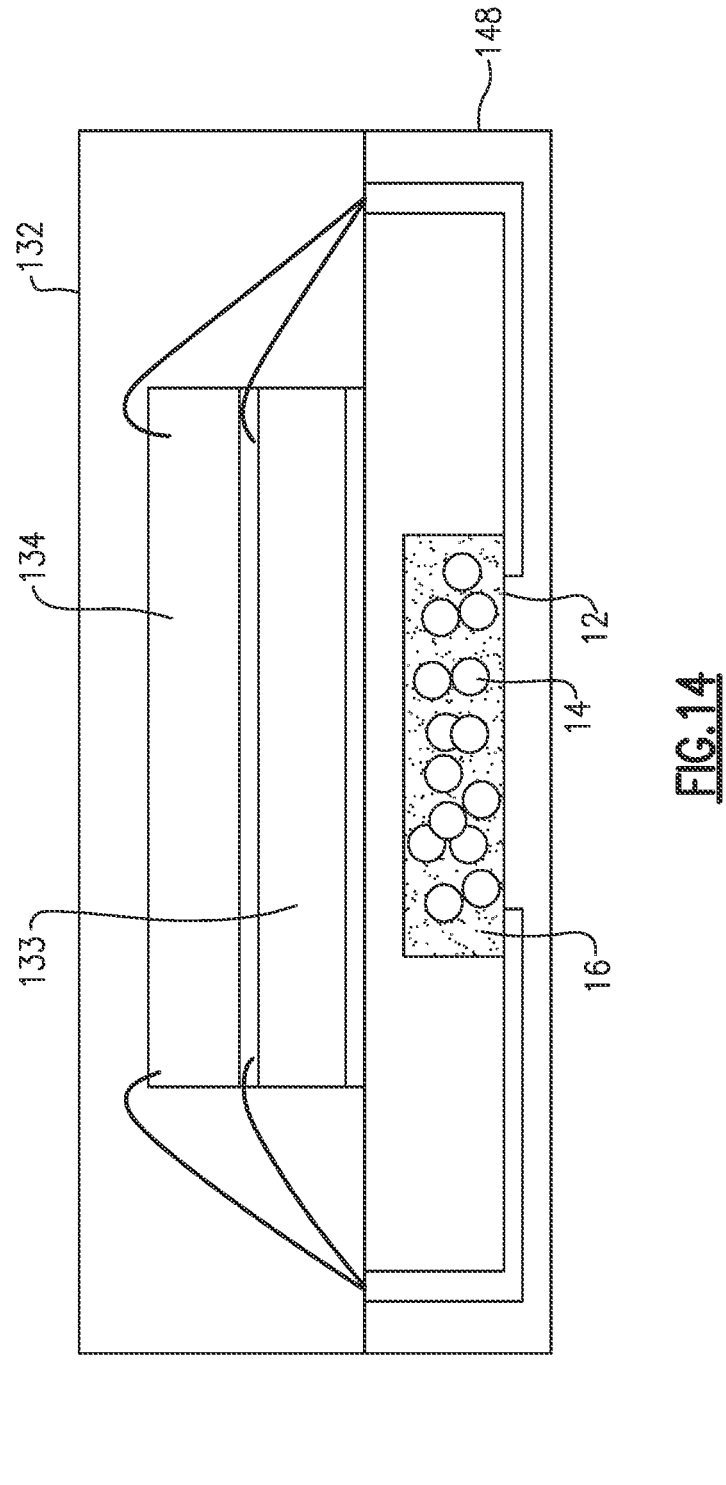
FIG. 14 is a schematic cross section of a system in a package with a temperature sensing based on movement of particles in a container, where the container is encapsulated in a laminate according to an embodiment.

The SIPs can function in harsh environments, such as hot environments, acidic environments, or corrosive environments. FIGS. 13A to 14 illustrate example cross-sectional schematic view of SIPs according to embodiments. In any of these SIPs, a biasing source (e.g., a biasing or internal magnetic field source) can be integrated with a container, for example as discussed above, or otherwise integrated (e.g., co-packaged with an integrated circuit and container) in the SIP.

FIG. 13A illustrates an SIP 130 with a container 12 with medium material 16 and particles 14 in the medium material 16. In the SIP 130, the container 12 is close to a surface of a packaging structure 132. The container 12 is stacked with a sensor 133 and an integrated circuit 134. The integrated circuit 134 includes circuitry of a measurement circuit that outputs an indication of the temperature and/or an indication of the applied magnetic field. In certain applications, the sensor 133 is included on an integrated circuit. According to some other applications, the sensor 133 is not included on an integrated circuit. The integrated circuit 134 can be application specific integrated circuit (ASIC). The integrated circuit 134 can include a semiconductor die. The sensor 133 can be on a semiconductor die.

FIG. 13B illustrates an SIP 135 with a container 12 that is exposed through an opening in a packaging structure 136. The container 12 is exposed through a top of the SIP 135. The container 12 of the SIP 135 can be exposed to a harsh environment. The harsh environment can be a high temperature environment, for example.

FIG. 13C illustrates an SIP 137 with a container 12 that is connected to an integrated circuit 134 though one or more intermediate layers 138. The one or more intermediate layers 138 can include one or more electrical connections between the container 12 and the integrated circuit 134, such as wiring layers in a circuit board (e.g., PCB or ceramic packaging substrate), interposer or redistribution layers (RDL). In the SIP 137, the container 12 can be exposed to a harsh environment. A packaging structure 139 covers less of the container 12 than the packaging structure 136 of the SIP 135.

FIG. 13D illustrates an SIP 140 with a container 12 that is flush with a surface of a packaging structure 142. The container 12 of the SIP 140 is exposed through an opening in the packaging structure 142.

FIG. 13E illustrates a SIP 144 with a protective layer 145 over a packaging structure 146. The protective layer 145 can protect the integrated circuit 134 and the sensor 133 from a harsh environment. The protective layer 145 can include a heat shield, stainless steel, a cooling plate, an anti-corrosive material, a hermetic shield, or the like. The protective layer 145 can protect components on the SIP 144 from a harsh environment. A container 12 can be exposed through an opening in the packaging structure 146 and the protective layer 145.

FIG. 14 illustrates a SIP 147 that includes a container 12 embedded in a laminate 148. The laminate 148 can be a printed circuit board. Embedding the container 12 in the laminate 148 can be useful in applications where a source of magnetic field or other stimulus for particle movement is placed on an opposite side of the laminate 148 relative to the sensor 133 and integrated circuit 134. In such applications, the container 12 can be positioned closer to certain sources of heat and/or magnetic field sources. In the SIP 147, the container 12 can be electrically connected to sensor 133 and/or integrated circuit 134 by way of electrical connections in the laminate 148 and conductive features, such as through mold vias, traces, solder bumps, wire bonds, lead frames, etc., enclosed by the packaging structure 132.

Figure 15A:
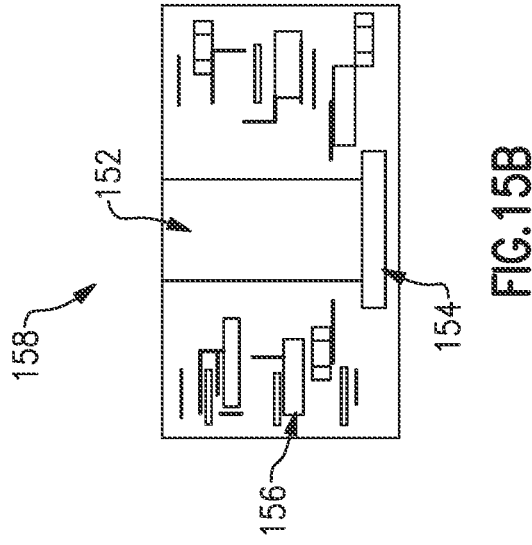
FIGS. 15A and 15B schematically illustrate example integrated systems with enclosures containing particles according to embodiments
Figure 15B:
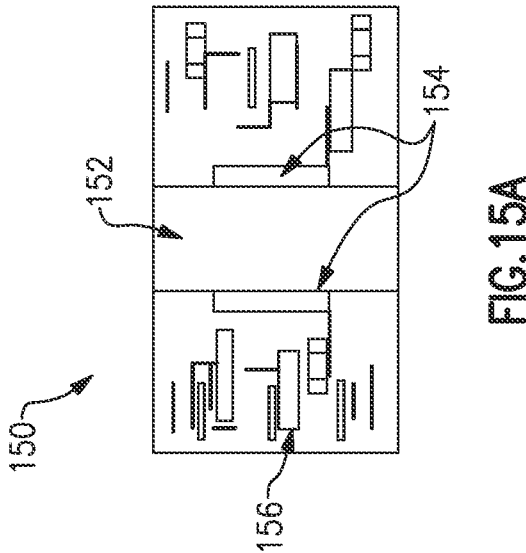

An integrated system can include an opening with an embedded structure. One or more enclosures with particles that can be exposed by the opening. An integrated circuit with a measurement circuit can be integrated with the enclosure. The integrated circuit can be a processing die that includes circuitry of a measurement circuit. FIGS. 15A and 15B illustrate examples of integrated systems with enclosures containing particles for temperature sensing and/or magnetic field sensing according to embodiments.

FIG. 15A illustrates an integrated system 150 with an opening 152 within an embedded structure. The integrated system 150 includes containers illustrated as enclosures 154 with particles in medium material that is a fluid in a particular temperature range. The particles can be magnetically sensitive. Integrated circuits 156 of the integrated system 150 include circuitry of measurement circuits for generating an indication of the temperature and/or an external magnetic field. The enclosures 154 are integrated with the integrated circuits 156, such by way of embedding in a common overmold, mounting on a common packaging substrate and/or surrounding with a common enclosure (e.g., "can" with an opening or window). The enclosures 154 are positioned on opposing sides of the opening 152 in FIG. 15A.

FIG. 15B illustrates an integrated system 158 with an opening 152 within an embedded structure. The integrated system 158 includes a container in the form of an enclosure 154 with particles in a medium material that is a fluid in a particular temperature range. Integrated circuits 156 of the integrated system 158 include circuitry of a measurement circuit for generating an indication of the temperature and/or an external magnetic field. The enclosure 154 is integrated with the integrated circuit 156, such as by way of embedding in a common overmold, mounting on a common packaging substrate and/or surrounding with a common enclosure (e.g., "can" with an opening or window). The enclosure 154 is positioned at an end of the opening 152 in FIG. 15B.

Measurement systems can wirelessly communicate with another device. Such a system can include one or more antennas that can wirelessly transmit the indication of the temperature and/or an external magnetic field generated by the measurement circuit. The one or more antennas can wirelessly communicate any other suitable information.

Figure 16:
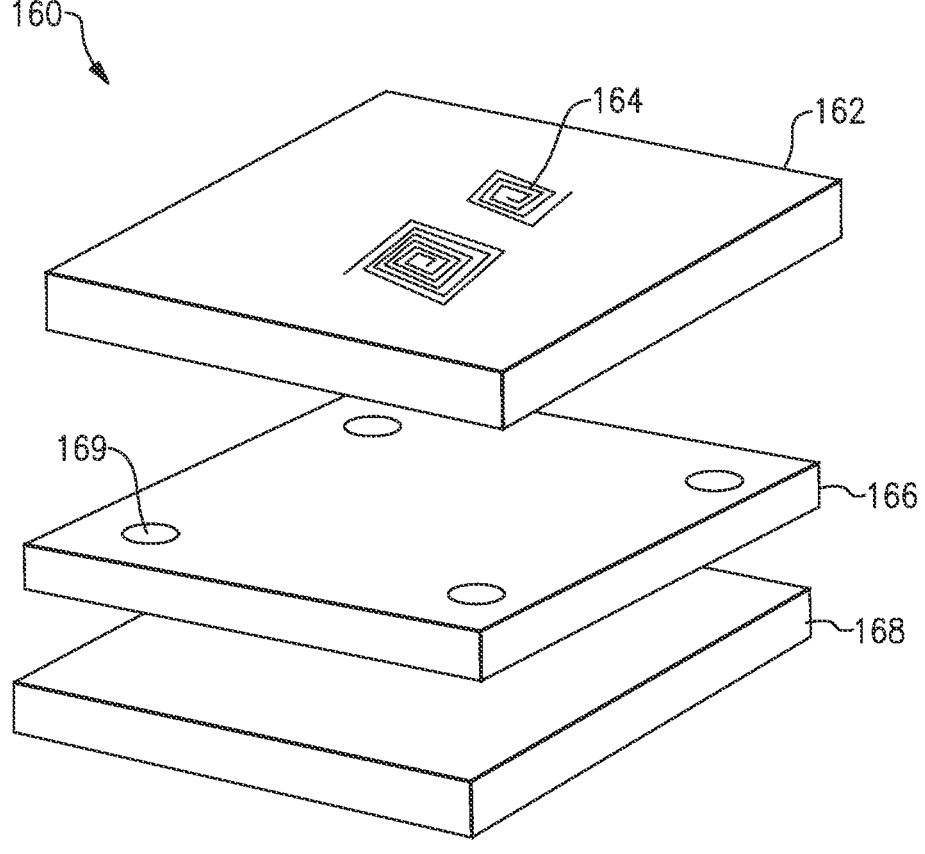
FIG. 16 is an exploded schematic view of an example temperature sensing system with wireless communication according to an embodiment.

FIG. 16 illustrates an exploded schematic view of an example temperature measurement system 160 according to an embodiment. The temperature measurement system 160 includes a wireless communication layer 162 that includes one or more antennas 164, a layer 166 including an integrated circuit that includes circuitry of a measurement circuit, and a layer 168 that includes an enclosure with particles, where movement of the particles is used to measure temperature in accordance with any suitable principles and advantages disclosed herein. Conductive vias 169 and/or traces can electrically connect layers of the temperature measurement system 160. The one or more antennas 164 can include a coil, for example. The one or more antennas 164 can be included in a radio frequency identification (RFID) tag. The wireless communication layer 162 can include circuitry to support wireless signal transmission, or such circuitry may be provided in a lower layer, such as the layer 166. In some instances, the measurement circuit and/or the wireless communication layer 162 can encrypt data for transmission via the one or more antennas 164. The one or more antennas 164 can transmit encrypted data.

Figure 17A:
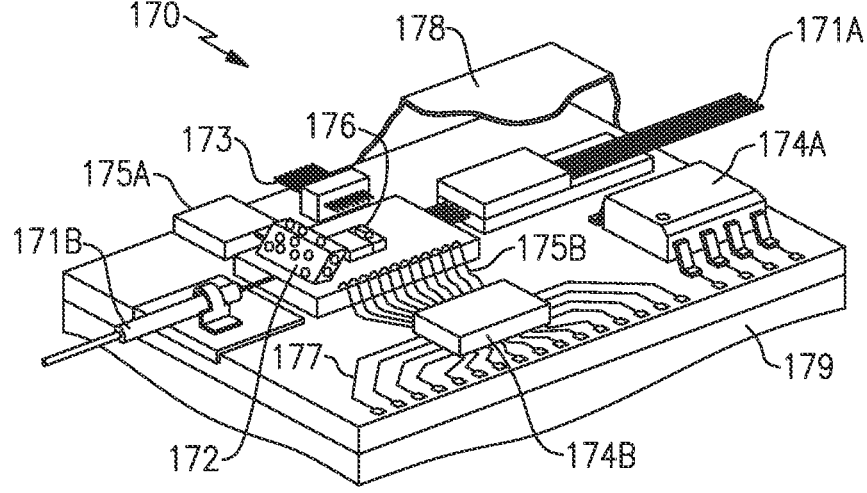
FIG. 17A is a schematic isometric view of a photonic module that includes temperature sensing based on movement of particles in a container according to an embodiment.

Containers with particles in phase change medium material can be included in various modules. FIG. 17A illustrates photonic module 170 that includes a container in the form of an enclosure 172 with particles according to an embodiment. The particles can move when medium material in the enclosure 172 is within a particular temperature range. For example, the particles can move in response to a known particle movement stimulus, such as an applied magnetic field, when the medium material is at a temperature within the temperature range. As the particles move, photodetectors and/or optical fibers can detect this change and transfer data to an integrated circuit 174. A light source 176, such as a laser, can be used in optical detection of particles within the enclosure 172. The integrated circuit 174 includes circuitry of a measurement circuit. The photonic module 170 can include one or more of optical fibers 171A, lensed optical fibers 171B, micro-optics 173, phonic wire bonds 175A, wire bonds 175B, a flip chip integrated circuit 174B, high speed electrical interposers 177, a packaging structure 178, and a thermal management system that can include microfluidics 179.

Figure 17B:
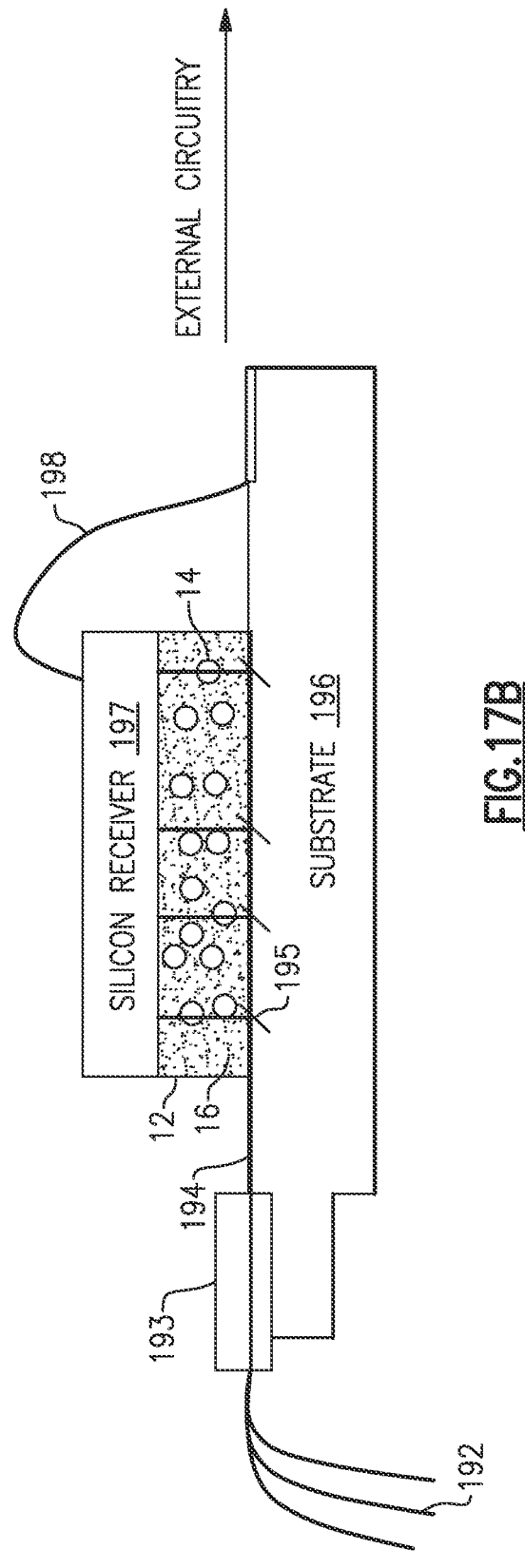
FIGS. 17B and 17C are schematic cross sectional or side views of optical measurement systems according to embodiments.
Figure 17C:
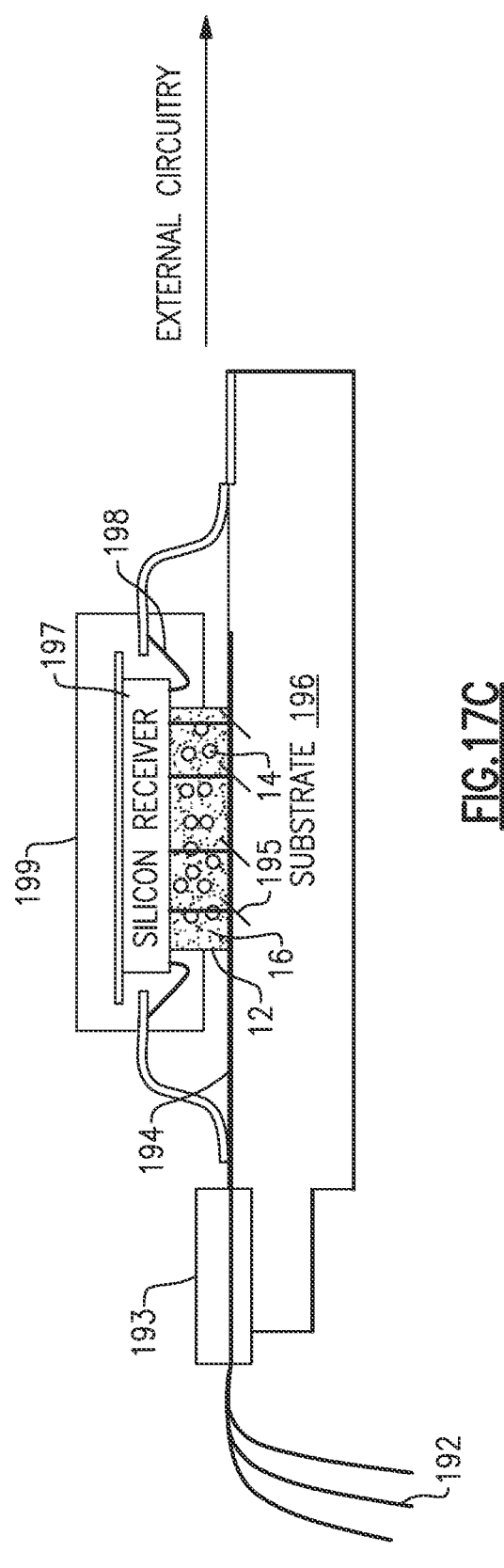

FIGS. 17B and 17C are schematic cross sectional or side views of optical measurement systems according to embodiments. The optical measurement systems can include fiber optic cables/sources 192, an optical edge coupler 193, waveguides 194, an angled gradient 195, particles 14 within a container 12 on a substrate 196, a silicon receiver 197, and an electrical path 198 (e.g., including a wire bond and/or any other suitable connections) to external circuitry. A packaging structure 199 can enclose the silicon receiver 197 and at least part of the container 12, for example, as shown in FIG. 17C.

The packaging structure 199 can have an opening through which a portion of the container 12 is exposed.

Figure 17D:
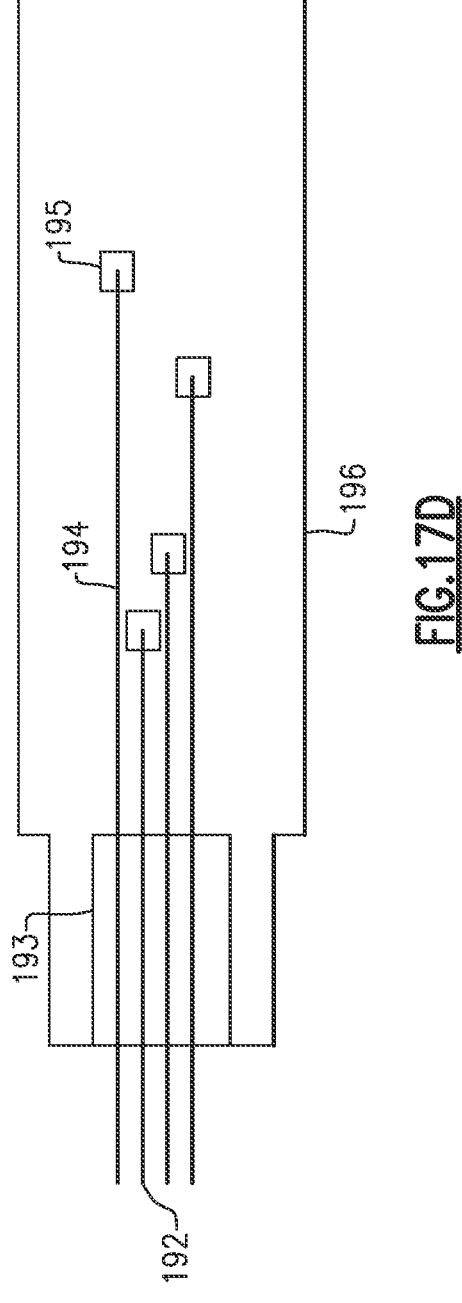
FIG. 17D is a schematic view of a portion of the optical systems of FIGS. 17B and 17C.

FIG. 17D is a schematic view of a portion of the optical systems of FIGS. 17B and 17C. By providing light sources at multiple different positions through the container 12, and multiple light detectors (e.g., a light sensitive array) at the opposite side of the container 12, changes in positions of the particles 14 can be detected.

FIG. 18 illustrates an electronic module 180 with electronic elements 182, 184, and 186 and an enclosure 188 with particles according to an embodiment. The particles can move when medium material in the enclosure 188 is within a particular temperature range. For example, the particles can move in response to a known particle movement stimulus, such as an applied magnetic field, when the medium material is at a temperature within the temperature range. The electronic elements 182, 184, and 186 and the enclosure 188 are integrated by mounting and electrical connection to a common circuit board 189. The electronic elements include an integrated circuit 182 with circuitry of a measurement circuit. The electronic elements can also include a sensor that provides an output to the measurement circuit. A module, system, or SIP can also include circuitry that encrypts the output of the sensor.

CONCLUSION

In the embodiments described above, apparatus, systems, and methods for detecting a temperature based on movement of at least one particle within a container are described in connection with particular embodiments. It will be understood, however, that the principles and advantages of the embodiments can be used for any other systems, apparatus, or methods with a need for temperature detection. Moreover, any suitable principles and advantages disclosed herein can be implemented in systems and in methods that detect temperature based on position and/or movement of at least one particle within a container. Systems and methods disclosed herein can detect temperature and magnetic field in certain applications.

The principles and advantages described herein can be implemented in various apparatuses. Examples of such apparatuses can include, but are not limited to, consumer electronic products, parts of the consumer electronic products, electronic test equipment, vehicular electronic products, industrial electronic products, etc. Examples of parts of consumer electronic products can include clocking circuits, analog-to-digital converts, amplifiers, rectifiers, programmable filters, attenuators, variable frequency circuits, etc. Examples of the electronic devices can include memory chips, memory modules, circuits of optical networks or other communication networks, and disk driver circuits. Electronic products can include, but are not limited to, wireless devices, a mobile phone (for example, a smart phone), cellular base stations, a telephone, a television, a computer monitor, a computer, a hand-held computer, a tablet computer, a laptop computer, a wearable computing device, a vehicular electronics system, a microwave, a refrigerator, a stereo system, a digital video recorder (DVR), a digital music players, a radio, a camera, a digital camera, a portable memory chip, a washer, a dryer, a washer/dryer, a copier, a facsimile machine, a scanner, a wrist watch, a smart watch, a clock, a wearable health monitoring device, etc. Further, apparatuses can include unfinished products.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or connected", as generally used herein, refer to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number may also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a measurement error.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states.

The teachings of the inventions provided herein can be applied to other systems, not necessarily the systems described above. The elements and acts of the various embodiments described above can be combined to provide further embodiments. The acts of the methods discussed herein can be performed in any order as appropriate. Moreover, the acts of the methods discussed herein can be performed serially or in parallel, as appropriate.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. Accordingly, the scope of the present inventions is defined by reference to the claims.

What is claimed is:

1. A method of temperature detection, the method comprising:

providing an enclosure that contains particles in a medium material, wherein the particles are magnetically sensitive and/or electrically conductive; and detecting, using a sensor integrated with the enclosure and a measurement circuit integrated with the enclosure, an indication of temperature based on movement of the particles in the enclosure, wherein the sensor is configured to detect the particles.

2. The method of claim 1, wherein the providing comprises providing the enclosure with the medium material in a first state, the detecting occurs after the medium material has transitioned from the first state to a second state, and the particles have a higher mobility in the second state than in the first state.

3. The method of claim 2, wherein the first and second states are different phases, the medium material is a solid in a first state and a fluid in the second state, and the medium material changes from the first state to the second state in response to the change in temperature.

4. The method of claim 2, wherein the first and second states are both fluid states with different viscosities at different temperatures.

5. The method of claim 1, wherein the medium material is a solid at room temperature.

6. The method of claim 1, wherein the movement of the particles is in response to a magnetic field.

7. The method of claim 1, wherein the movement of the particles causes the particles to cluster.

8. The method of claim 1, further comprising wirelessly transmitting, from at least one antenna, information associated with the temperature based on the detecting.

9. The method of claim 1, further comprising resetting positions of the particles after detecting the indication of temperature.

10. The method of claim 1, further comprising:

providing at least one additional enclosure containing particles in a second medium material, wherein the second medium material changes phase at a different temperature than the medium material;

detecting a lack of movement of the particles in the additional enclosure; and determining a temperature range based on the movement of the particles in the enclosure and the lack of movement of the particles in the additional enclosure.

11. The method of claim 1, further comprising:

providing at least one additional enclosure containing particles in medium material, wherein the enclosure and the additional enclosure are in an environment;

detecting a second indication of temperature based on movement of the particles in the additional enclosure; and outputting temperature information for different locations of the environment based on the indication of temperature and the second indication of temperature.

12. A system with temperature detection, the system comprising:

a container;

medium material within the container, wherein a property of the medium material changes in response to a change in temperature;

at least one particle within the container, wherein the at least one particle is magnetically sensitive and/or electrically conductive, and wherein mobility of the at least one particle in the container changes in association with a change in the property of the medium material; and a measurement circuit configured to detect an indication of temperature based on movement of the at least one particle within the container, wherein the measurement circuit is integrated with the container.

13. The system of claim 12, wherein the property is a phase of the medium material, and the medium material changes from a solid phase to a fluid phase in response to the change in temperature.

14. The system of claim 12, wherein the container comprises an integrated conductive structure.

15. The system of claim 12, further comprising:

a second container;

second medium material within the second container; and at least one second particle within the second container, wherein the measurement circuit is configured to generate the indication of temperature based on the movement of the at least one particle in the container and lack of movement of the at least one second particle in the second container.

16. The system of claim 12, further comprising a sensor configured to provide an output to the measurement circuit, wherein the measurement circuit comprises circuitry of an integrated circuit that is integrated with the container.

17. A method of temperature detection, the method comprising:

providing an enclosure that contains particles in a medium material in a first phase;

maintaining positions of the particles until temperature crosses a threshold at which the medium material changes phase from the first phase to a second phase, wherein the particles have a higher mobility in the second phase than in the first phase, and wherein the particles move based on the temperature crossing the threshold; and resetting the positions of the particles after temperature is detected based on particle movement.

18. The method of claim 17, wherein the particles are electrically conductive and/or magnetically sensitive.

19. The method of claim 17, wherein the temperature crosses the threshold during a sterilization process.

20. The method of claim 17, wherein the temperature crosses the threshold in a cold chain, and the positions of the particles indicate that the cold chain has been broken.

* * * * *